(12) United States Patent
Kinouchi et al.

(10) Patent No.: US 12,145,441 B2
(45) Date of Patent: Nov. 19, 2024

(54) PEDAL DEVICE

(71) Applicant: DENSO CORPORATION, Kariya (JP)

(72) Inventors: Soichi Kinouchi, Kariya (JP); Takuto Kita, Kariya (JP); Kiyoshi Kimura, Kariya (JP); Tetsuo Hariu, Kariya (JP); Yuusuke Yoshida, Kariya (JP); Etsugo Yanagida, Kariya (JP); Daisuke Hokuto, Kariya (JP); Takehiro Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/176,069

(22) Filed: Feb. 28, 2023

(65) Prior Publication Data

US 2023/0202297 A1 Jun. 29, 2023

Related U.S. Application Data

(63) Continuation of application No. PCT/JP2021/028969, filed on Aug. 4, 2021.

(30) Foreign Application Priority Data

Sep. 4, 2020 (JP) .................................. 2020-148869

(51) Int. Cl.
*B60K 26/02* (2006.01)
*B60T 7/04* (2006.01)

(52) U.S. Cl.
CPC .............. *B60K 26/02* (2013.01); *B60T 7/042* (2013.01); *B60K 2026/026* (2013.01); *B60Y 2400/412* (2013.01)

(58) Field of Classification Search
CPC . G05G 1/36; G05G 1/40; G05G 1/405; B60R 21/09; B60K 26/02; B60T 7/042; B60T 2026/026; B60Y 2400/412
See application file for complete search history.

(56) References Cited

U.S. PATENT DOCUMENTS 6,134,492 A * 10/2000 Breed .................. B60N 2/0022
280/727
6,182,525 B1 * 2/2001 Bowers .................. B60K 23/02
180/274

(Continued)

FOREIGN PATENT DOCUMENTS

DE 2941345 A * 4/1981 ................ B60T 7/04
DE 10347845 A1 * 5/2005 ............. B60K 26/00

(Continued)

*Primary Examiner* — Thomas C Diaz
(74) *Attorney, Agent, or Firm* — Nixon & Vanderhye P.C.

(57) ABSTRACT

A pedal device comprises a brake pedal, an accelerator pedal, a support member and an adjusting device. The brake pedal is operated to be depressed by a leg of a passenger, and an operation amount of a depressing operation of the brake pedal is transmitted as an electrical signal. The accelerator pedal is operated to be depressed by a leg of the passenger, and an operation amount of a depressing operation of the accelerator pedal is transmitted as an electrical signal. The support member is connected with the brake pedal and the accelerator pedal, respectively, to support the brake pedal and the accelerator pedal in a rotatable manner. The adjusting device adjusts a position or a posture of the pedal unit including the brake pedal, the accelerator pedal, and the support member.

15 Claims, 15 Drawing Sheets

(56) References Cited

U.S. PATENT DOCUMENTS

| | | | | |
|---|---|---|---|---|
| 6,364,047 B1* | 4/2002 | Bortolon | ................ | B60K 26/02 |
| | | | | 74/513 |
| 6,431,304 B1* | 8/2002 | Smythe | ................. | G05G 1/405 |
| | | | | 74/513 |
| 6,962,094 B2* | 11/2005 | Porter | .................... | G05G 1/405 |
| | | | | 74/512 |
| 7,650,212 B2* | 1/2010 | Breed | ........................ | B60T 7/06 |
| | | | | 280/775 |
| 10,739,809 B2* | 8/2020 | Wojciechowski | ........ | B60T 7/06 |
| 2004/0040408 A1* | 3/2004 | Shaw | ........................ | G05G 1/42 |
| | | | | 74/560 |
| 2005/0109555 A1 | 5/2005 | Ohtsubo et al. | | |
| 2005/0115354 A1 | 6/2005 | Rinero et al. | | |
| 2014/0251066 A1* | 9/2014 | Stachniak | .............. | B64C 13/044 |
| | | | | 74/512 |
| 2015/0107401 A1* | 4/2015 | Farrell | .................... | B60T 7/042 |
| | | | | 74/512 |
| 2018/0135726 A1 | 5/2018 | Kita et al. | | |
| 2018/0239483 A1* | 8/2018 | Brombach | ............. | B60K 35/10 |
| 2019/0310678 A1* | 10/2019 | Wojciechowski | ... | B60K 26/021 |
| 2021/0284020 A1 | 9/2021 | Kita et al. | | |

FOREIGN PATENT DOCUMENTS

| | | | | |
|---|---|---|---|---|
| JP | 2016-168972 | 9/2016 | | |
| SE | 530997 C2 * | 11/2008 | ............... | G05G 1/40 |
| WO | WO-0125869 A1 * | 4/2001 | ............. | B60K 26/02 |

* cited by examiner

PEDAL DEVICE

CROSS REFERENCE TO RELATED APPLICATIONS

This application is a continuation application of International Patent Application No. PCT/JP2021/028969 filed on Aug. 4, 2021, which designated the U.S. and is based on and claims the benefit of priority from Japanese Patent Application No. 2020-148869 filed on Sep. 4, 2020, the contents of which are incorporated herein by reference.

TECHNICAL FIELD

The present disclosure relates to a pedal device to be mounted on a vehicle.

BACKGROUND

Vehicles have a pedal in order to input an operation amount. The pedal may be an accelerator pedal which may be operated to adjust propelling power or a speed of the vehicle. The pedal may be a brake pedal which may be operated to adjust a brake pressure for reducing a speed of the vehicle. A position or a posture of the pedal may be subject to adjustment. Due to mechanical configurations of the pedal, an adjustable range is limited. In the above aspects, or in other aspects not mentioned, there is a need for further improvements in a pedal device.

SUMMARY

According to an aspect of the present disclosure, a pedal device to be mounted on a vehicle, the pedal device comprising: a brake pedal which is operated to be depressed by a leg of a passenger and an operation amount of a depressing operation is transmitted as an electrical signal; an accelerator pedal which is operated to be depressed by a leg of a passenger and an operation amount of a depressing operation is transmitted as an electrical signal; a support member which is connected with the brake pedal and the accelerator pedal, respectively, and supports the brake pedal and the accelerator pedal so as to be able to swing in response to a depressing operation by a leg of a passenger; and an adjusting device which adjusts the position or the posture of a pedal unit including a brake pedal, an accelerator pedal, and a support member.

In this way, there are fewer mechanical restrictions in changing a position or a posture of the pedal unit, in comparison with, e.g., a configuration in which an amount of operation of the brake pedal is mechanically transmitted to the master cylinder. Therefore, it is possible to easily enlarge an adjustable range of the position or the posture of the pedal unit.

The reference numerals in parentheses attached to the components and the like indicate an example of correspondence between the components and the like and specific components and the like described in an embodiment to be described below.

DETAILED DESCRIPTION

Figure 1:
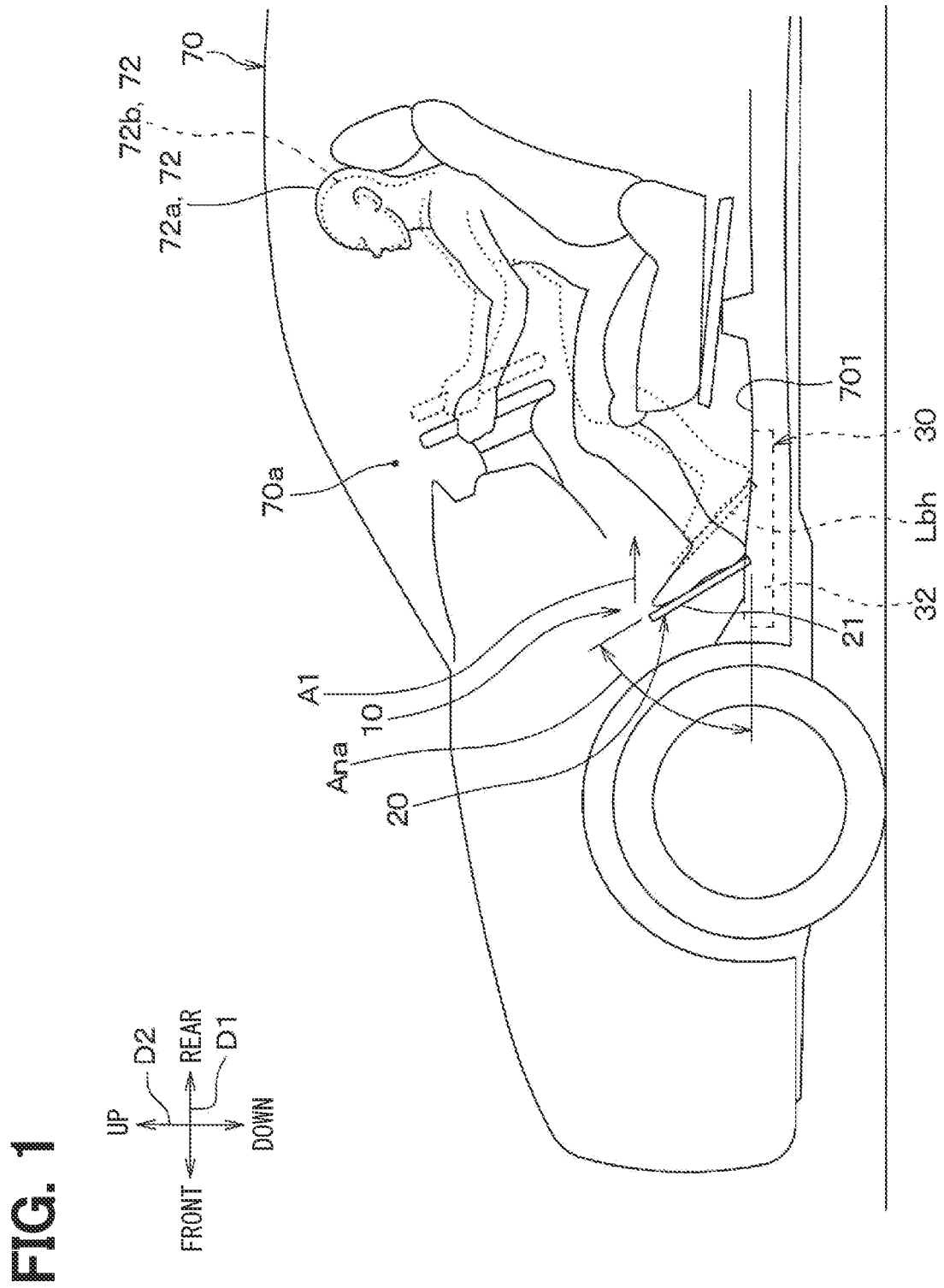
FIG. 1 is a diagram schematically showing, in an excerpted manner, a front portion of a vehicle in which a pedal device is mounted according to a first embodiment.

JP4259301B discloses a driving posture adjusting device. The driving posture adjusting device includes a pedal position adjusting means, and the pedal position adjusting means adjusts an operational angle of each of the accelerator pedal and the brake pedal which may be operated by a leg of a passenger. Also, the accelerator pedal and the brake pedal are individually connected so as to be suspended from brackets fixed to a dash lower panel.

Currently, it is seen that many vehicles have a brake pedal mechanically connected to a master cylinder. In such a vehicle, if it is tried to perform a position adjustment of the accelerator pedal and the brake pedal shown in JP4259301B, this position adjustment must be severely restricted due to a member mechanically connected to the brake pedal such as a master cylinder or the like. The above has been found as a result of detailed studies by the inventors.

In view of the above points, it is an object of the present disclosure to provide a pedal device which is capable of easily enlarge an adjustable range of the position or the posture of a pedal unit including a brake pedal and an accelerator pedal.

Hereinafter, embodiments are described with reference to the drawings. In the following embodiments, the same reference numeral is given to the same or equivalent parts in the drawings.

First Embodiment

As shown in FIG. 1, a pedal device 10 of this embodiment is adapted to be mounted on a vehicle 70. The vehicle 70 of this embodiment is an engine vehicle having only an engine as a drive source for moving, but may be an electric vehicle or a hybrid vehicle, for example.

A dashed line indicates a short passenger 72b who is shorter than a tall passenger 72a indicated by a solid line, and a steering wheel gripped by the short passenger 72b in FIG. 1. A dashed line Lbh indicates that the accelerator pedal 21 indicated by the solid line is moved to a vehicle rear side. For example, the tall passenger 72a indicated by the solid line is approximately 170 cm tall, and the short passenger 72b indicated by the broken line is approximately 150 cm tall. In the following description, the passengers 72a and 72b are simply referred to as a passenger 72 when the heights of the passengers 72a and 72b are not particularly distinguished.

Figure 2:
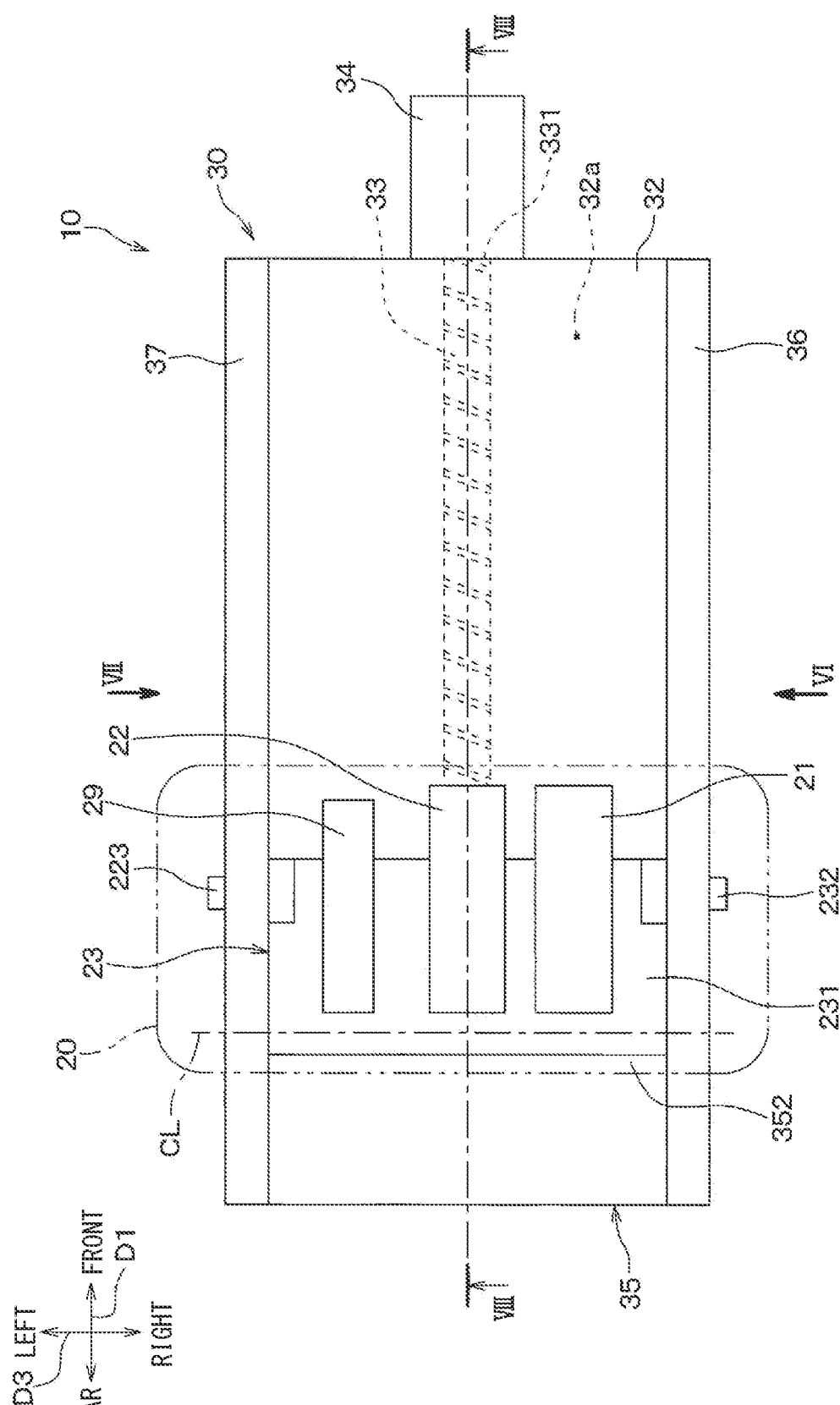
FIG. 2 is a top view schematically showing a pedal unit and an adjusting device included in the pedal device viewed in a direction from a vehicle up side toward a vehicle down side according to the first embodiment.

Double-headed arrows in FIGS. 1 and 2 each indicates directions of the vehicle 70 on which the pedal device 10 is mounted. That is, a vehicle front-rear direction D1, which is a front-rear direction of the vehicle 70, and a vehicle up-down direction D2, which is an up-down direction of the vehicle 70, are indicated by double-headed arrows in FIG. 1, and a vehicle right-left direction D3, which is a right-left direction of the vehicle 70 is indicated by a double-headed arrow in FIG. 2. These directions D1, D2 and D3 are directions which cross each other, strictly speaking, directions which are perpendicular to each other.

Further, in a description of this embodiment, a front side in the vehicle front-rear direction D1 may be also referred to as a vehicle front side, a rear side in the vehicle front-rear direction D1 may be also referred to as a vehicle rear side, an up side in the vehicle up-down direction D2 may be also referred to as a vehicle up side, and a down side in the vehicle up-down direction D2 may be also referred to as a vehicle down side. Further, a left side in the vehicle right-left direction D3 may be also referred to as a vehicle left side, and a right side in the vehicle right-left direction D3 may be also referred to as a vehicle right side. Also, the vehicle right-left direction D3 may be referred to as the vehicle width direction D3.

As shown in FIGS. 1, 2, 3, 4 and 5, the pedal device 10 includes a pedal unit 20, an adjusting device 30, and a control unit 12 which controls the adjusting device 30. The pedal unit 20 and the adjusting device 30 are arranged near feet of the passenger 72 as a driver in the vehicle 70.

Figure 3:
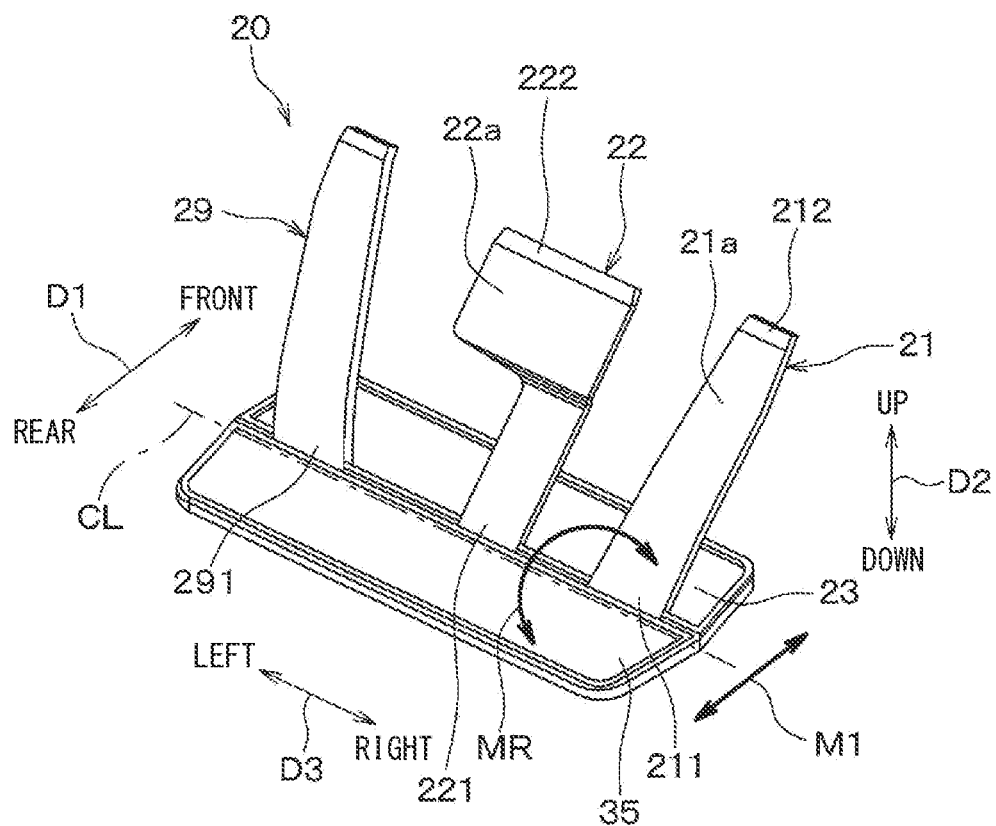
FIG. 3 is a perspective view showing, in an excerpted manner, the pedal unit according to the first embodiment.
Figure 4:
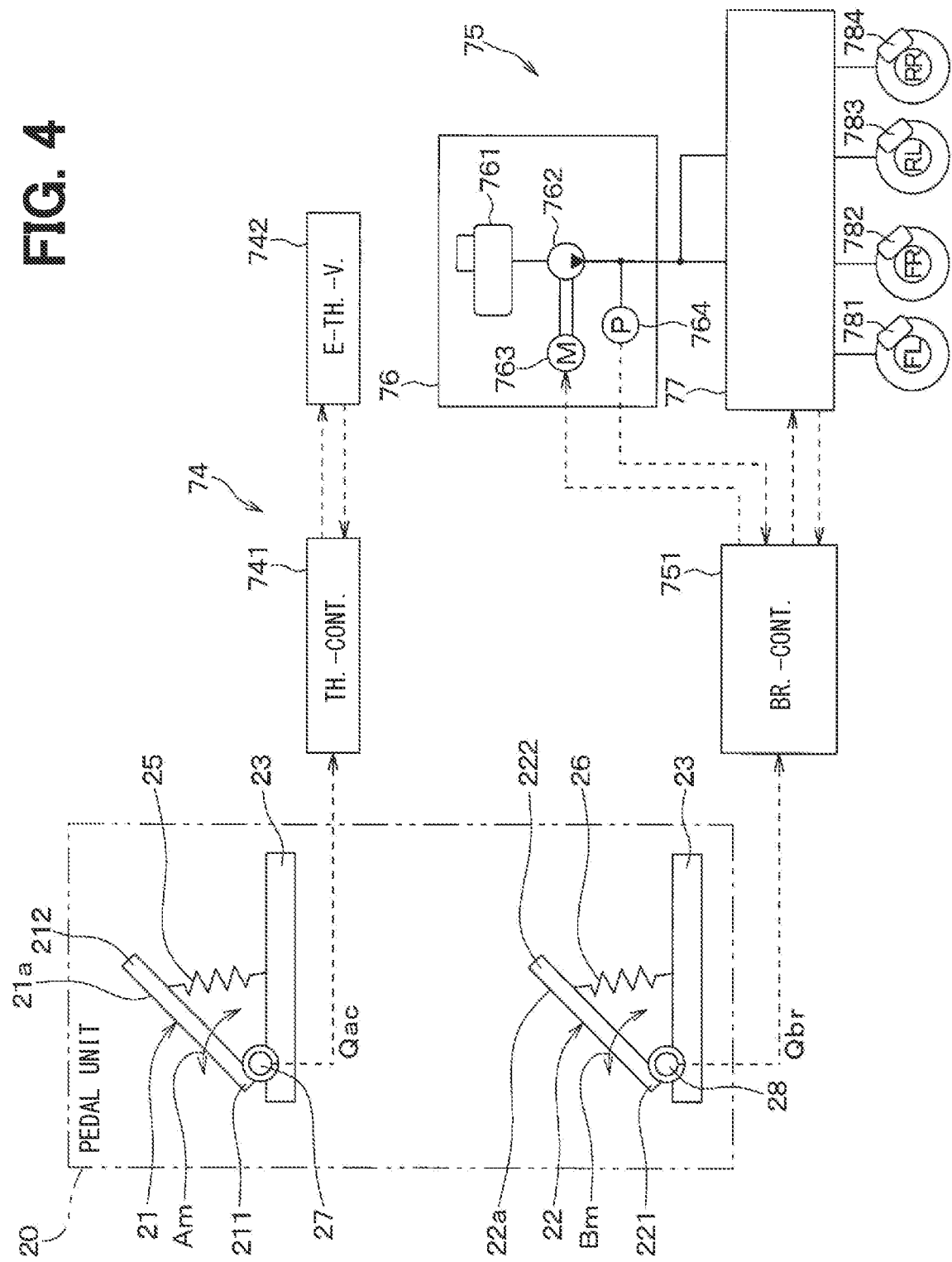
FIG. 4 is a diagram schematically showing a block diagram schematically showing a schematic configuration of an accelerator-by-wire system and a brake-by-wire system mounted on the vehicle, together with a diagram schematically showing a schematic configuration of the pedal unit according to the first embodiment.

As shown in FIGS. 2, 3 and 4, the pedal unit 20 includes an accelerator pedal 21, a brake pedal 22, a support member 23, an accelerator return device 25, a brake return force device 26, an accelerator operation amount sensor 27, and a brake operation amount sensor 28 and a footrest 29.

As shown in FIGS. 1, 3, and 4, the accelerator pedal 21 is a pedal which is operated to be depressed by a leg of the passenger 72 who is the driver. As the operation amount Qac of a depressing operation of the accelerator pedal 21, i.e., the accelerator pedal operation amount Qac increases, for example, an output of the drive source for running the vehicle 70 is increased.

Specifically, as shown in FIGS. 3 and 4, the accelerator pedal 21 is connected to the support member 23 at a lower end 211 of the accelerator pedal 21 and the support member 23 supports the accelerator pedal 21 so as to be able to swing in response to a depressing operation of the passenger 72.

Specifically, the accelerator pedal 21 of this embodiment is rotatable with respect to the support member 23 so that the upper end portion 212 of the accelerator pedal 21 moves in the vehicle front-rear direction D1 about the lower end portion 211 of the accelerator pedal 21 as a rotational center. In short, the accelerator pedal 21 is an organ-type pedal that can swing as indicated by an arrow Am in FIG. 4.

The accelerator pedal operation amount Qac in this embodiment is expressed by a rotational angle of the accelerator pedal 21. For example, the accelerator pedal operation amount Qac is expressed by a rotational angle of a rotation of the accelerator pedal 21 from a no-operation position which is based on a rotational position of a no-accelerator depressing operation period (i.e., the no-operation position) in which the accelerator pedal 21 does not receive any depressing operation. In short, the accelerator pedal operation amount Qac is an amount of operation of the accelerator pedal 21 from the non-operation position.

Further, the accelerator pedal 21 has an accelerator pad surface 21a which receives the leg of the passenger 72 when the accelerator pedal 21 is operated by the leg of the passenger 72. The accelerator pad surface 21a faces the vehicle rear side and oblique to the vehicle up side in the no-accelerator depressing operation period.

Further, as shown in FIG. 4, the accelerator pedal 21 forms a part of an accelerator-by-wire system 74. Therefore, an accelerator operation amount sensor 27 is connected to the accelerator pedal 21. The accelerator-by-wire system 74 is a system which drives an electronic throttle valve 742 based on the accelerator pedal operation amount Qac obtained as an electric signal.

The accelerator operation amount sensor 27 in the accelerator-by-wire system 74 detects an accelerator pedal operation amount Qac and outputs an electric signal indicative of the accelerator pedal operation amount Qac to the throttle control device 741 included in the accelerator-by-wire system 74. That is, the accelerator pedal operation amount Qac is transmitted from the accelerator operation amount sensor 27 to the throttle control device 741 as an electric signal.

The throttle control device 741 is configured as a microcomputer including a CPU, ROM, RAM, etc. (not shown), and executes a computer program stored in semiconductor memory such as ROM, RAM, etc., which are non-transitional tangible storage medium. That is, the throttle control device 741 executes various control processes according to its computer program. By executing this computer program, a method corresponding to the computer program is performed. The configuration of such a control device is similar to a brake control device 751, a control unit 12, and an autonomous drive control device 82, which are described later.

Further, the throttle control device 741 increases or decreases a valve opening degree of the electronic throttle valve 742 according to the accelerator pedal operation amount Qac obtained from the accelerator operation amount sensor 27. For example, the throttle control device 741 increases the opening degree of the electronic throttle valve 742 according to a preset relationship as the accelerator pedal operation amount Qac increases.

The electronic throttle valve 742 is an electric valve device provided in an intake system of the engine. As the valve opening degree of the electronic throttle valve 742 increases, an intake air amount of the engine increases.

As shown in FIGS. 2, 3, and 4, the brake pedal 22 is a pedal which is operated to be depressed by a leg of the passenger 72 and is arranged side by side with respect to the accelerator pedal 21 on a vehicle left side. As the operation amount Qbr of the brake pedal 22, that is, the brake pedal operation amount Qbr increases, the brake fluid pressure supplied to the wheel cylinders 781, 782, 783 and 784 provided corresponding to each wheel of the vehicle 70 increases. That is, the braking force for braking each wheel of the vehicle 70 increases as the brake pedal operation amount Qbr increases.

Specifically, as shown in FIGS. 3 and 4, the brake pedal 22 is connected to the support member 23 at a lower end 221 of the brake pedal 22 and the support member 23 supports the brake pedal 22 so as to be able to swing in response to a depressing operation of the passenger 72.

Specifically, the brake pedal 22 of this embodiment is rotatable with respect to the support member 23 so that the upper end 222 of the brake pedal 22 moves in the vehicle front-rear direction D1 about the lower end 221 of the brake pedal 22 as a rotational center. In short, the brake pedal 22 is an organ-type pedal that can swing as indicated by an arrow Bm in FIG. 4.

The brake pedal operation amount Qbr of this embodiment is expressed by a rotational angle of the brake pedal 22. For example, the brake pedal operation amount Qbr is expressed by a rotational angle of a rotation of the brake pedal 22 from a no-operation position which is based on a rotational position of a no-brake depressing operation period (i.e., the no-operation position) in which the brake pedal 22 does not receive any depressing operation. In short, the brake pedal operation amount Qbr is an amount of operation of the brake pedal 22 from the no-operation position.

Also, the brake pedal 22 has a brake pad surface 22a which receives the leg of the passenger 72 when the brake pedal 22 is operated by the leg of the passenger 72. The brake pad surface 22a faces the vehicle rear side and oblique to the vehicle up side in the no-brake depressing operation period.

Also, as shown in FIG. 4, the brake pedal 22 forms a part of a brake-by-wire system 75. Therefore, a brake operation amount sensor 28 is connected to the brake pedal 22. The brake-by-wire system 75 is a system that adjusts a brake fluid pressure for braking each wheel based on a brake pedal operation amount Qbr obtained as an electric signal.

A brake operation amount sensor 28 in the brake-by-wire system 75 detects a brake-pedal operation amount Qbr and outputs an electric signal indicative of the brake-pedal operation amount Qbr to the brake control device 751 included in the brake-by-wire system 75. That is, the brake pedal operation amount Qbr is transmitted from the brake operation amount sensor 28 to the brake control device 751 as an electric signal.

For example, the brake control device 751 adjusts fluid pressure supplied to each one of wheel cylinders 781, 782, 783 and 784 by controlling the first actuator 76 and the second actuator 77 based on the brake pedal operation amount Qbr obtained as an electric signal.

The front-left wheel cylinder 781 is arranged on the front-left wheel FL, and the front-right wheel cylinder 782 is arranged on the front-right wheel FR. The rear-left wheel cylinder 783 is arranged on the rear-left wheel RL, and the rear-right wheel cylinder 784 is arranged on the rear-right wheel RR.

The front left wheel cylinder 781, the front right wheel cylinder 782, the rear left wheel cylinder 783, and the rear right wheel cylinder 784 are connected to respective brake pads (not shown) of the vehicle 70, respectively. As the brake fluid pressure supplied to each wheel cylinder 781, 782, 783 and 784 increases, the brake pads of the wheels FL, FR, RL, and RR are pressed more strongly against the brake discs corresponding to the wheels, and frictional force between the brake discs and the brake pads are increased. Thereby, a braking force is generated to stop a rotation of each wheel FL, FR, RL, and RR.

The first actuator 76 generates a brake fluid pressure. By increasing the brake fluid pressure, the first actuator 76 increases the brake fluid pressure supplied to each of the four wheel cylinders 781, 782, 783 and 784. Specifically, the first actuator 76 has a reservoir 761, a hydraulic pump 762, a pump motor 763 and a pressure sensor 764.

The reservoir 761 stores brake fluid such as oil, and also supplies the brake fluid to the hydraulic pump 762.

The hydraulic pump 762 is driven by the pump motor 763 electrically powered. Thus, the hydraulic pump 762 increases the pressure of the brake fluid from the reservoir 761. The brake fluid with an increased fluid pressure flows from the first actuator 76 to the second actuator 77.

The pressure sensor 764 outputs an electric signal corresponding to a hydraulic pressure of the brake fluid flowing to the second actuator 77 to the brake control device 751.

The second actuator 77 includes, e.g., a differential pressure control valve, a pressure increasing control valve, a pressure reducing control valve, a pump, a motor, and a pressure sensor and the like (not illustrated) and generates brake fluid pressure. In addition, the second actuator 77 supplies the brake fluid flowing from the first actuator 76 to the front-left wheel cylinder 781, the front-right wheel cylinder 782, the rear-left wheel cylinder 783, and the rear-right wheel cylinder 784. respectively.

The master cylinder is not involved in the brake fluid pressure circuit which includes the first and second actuators 76 and 77 and supplies brake fluid pressure to the wheel cylinders 781, 782, 783 and 784. Therefore, the brake pedal 22 is not mechanically connected to the master cylinder. That is, there is no master cylinder mechanically operated with the brake pedal 22. The master cylinder is a hydraulic cylinder which generates a brake fluid pressure as a master pressure to be supplied to each of the wheel cylinders 781, 782, 783 and 784 according to the brake pedal operation amount Qbr.

As shown in FIGS. 2 and 3, the footrest 29 is a structure on which a foot of the passenger 72 seated may be placed. The footrest 29 is arranged side by side on the vehicle left side with respect to the brake pedal 22. The footrest 29 is connected and fixed to the support member 23 at a lower end 291 of the footrest 29.

The support member 23 is provided on the vehicle down side with respect to each of the accelerator pedal 21, the brake pedal 22 and the footrest 29. The support member 23 functions as a base member for supporting the accelerator pedal 21, the brake pedal 22 and footrest 29.

As shown in FIG. 4, the accelerator return device 25 and the brake return device 26 include elastic members such as coil springs. The accelerator return device 25 and the brake return device 26 are each connected to, e.g., the support member 23 and supported by the support member 23. The accelerator return device 25 generates a reaction force which opposes a depressing force of the passenger 72 who depresses the accelerator pedal 21. In addition, the brake return device 26 generates a reaction force which opposes a depressing force of the passenger 72 who depresses the brake pedal 22. As a confirmation, the brake return device 26 is not the master cylinder.

Figure 5:
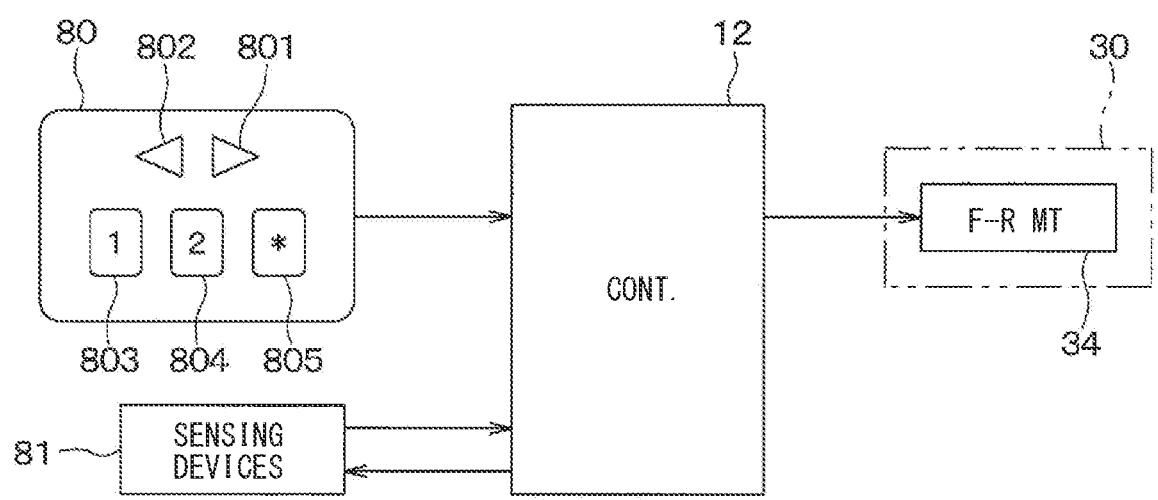
FIG. 5 is a block diagram relating to control of the adjusting device of the first embodiment.

As shown in FIGS. 2, 3, and 5, the adjusting device 30 is a device which adjusts the position or the posture of the pedal unit 20 according to command signals from the control unit 12, which is an electronic control unit. In this embodiment, the adjusting device 30 is capable of performing a position adjustment which moves the pedal unit 20 in the vehicle front-rear direction D1 as indicated by an arrow M1 in FIG. 3. That is, the adjustment of the position or the posture of the pedal unit 20 performed by the adjusting device 30 includes an adjusting the position of the pedal unit 20 in the vehicle front-rear direction D1. For example, the pedal unit 20 approaches the passenger 72 seated, as it moves toward the vehicle rear side.

The adjusting device 30 is capable of also adjusting the posture of tilting the pedal unit 20 by rotating it about the unit rotation axis CL extending in the vehicle right-left direction D3, as indicated by an arrow MR in FIG. 3. That is, the adjustment of the position or the posture of the pedal unit 20 performed by the adjusting device 30 includes an adjusting function of the inclination of the pedal unit 20 in a view along the vehicle right-left direction D3. Specifically, the adjustment of the inclination of the pedal unit 20 means adjusting the inclination of the pedal unit 20 with respect to a predetermined reference posture of the pedal unit 20. The reference posture of the pedal unit 20 may be a possible predetermined one posture which the pedal unit 20 can take, and is not particularly limited.

Since the relative positional relationship between the unit rotation axis CL and the pedal unit 20 is constant, if the pedal unit 20 moves in the vehicle front-rear direction D1, the unit rotation axis CL also moves in the vehicle front-rear direction D1. In other words, the inclination of the pedal unit 20 in a view along the vehicle right-left direction D3 is the inclination angle of the pedal unit 20 shown in FIG. 8 or 9, which are described later.

Figure 6:
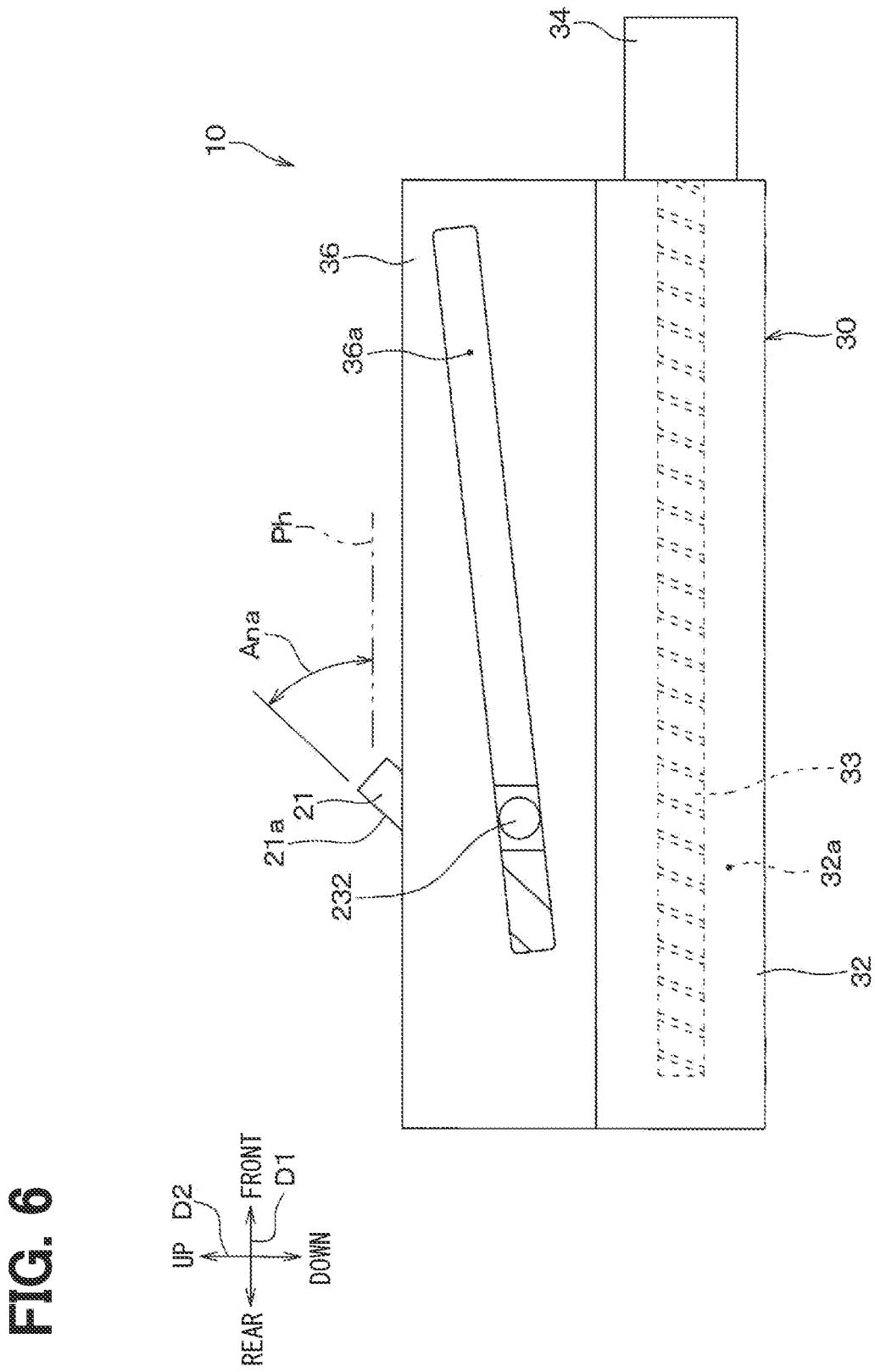
FIG. 6 is a view in a direction of an arrow VI in FIG. 2.
Figure 7:
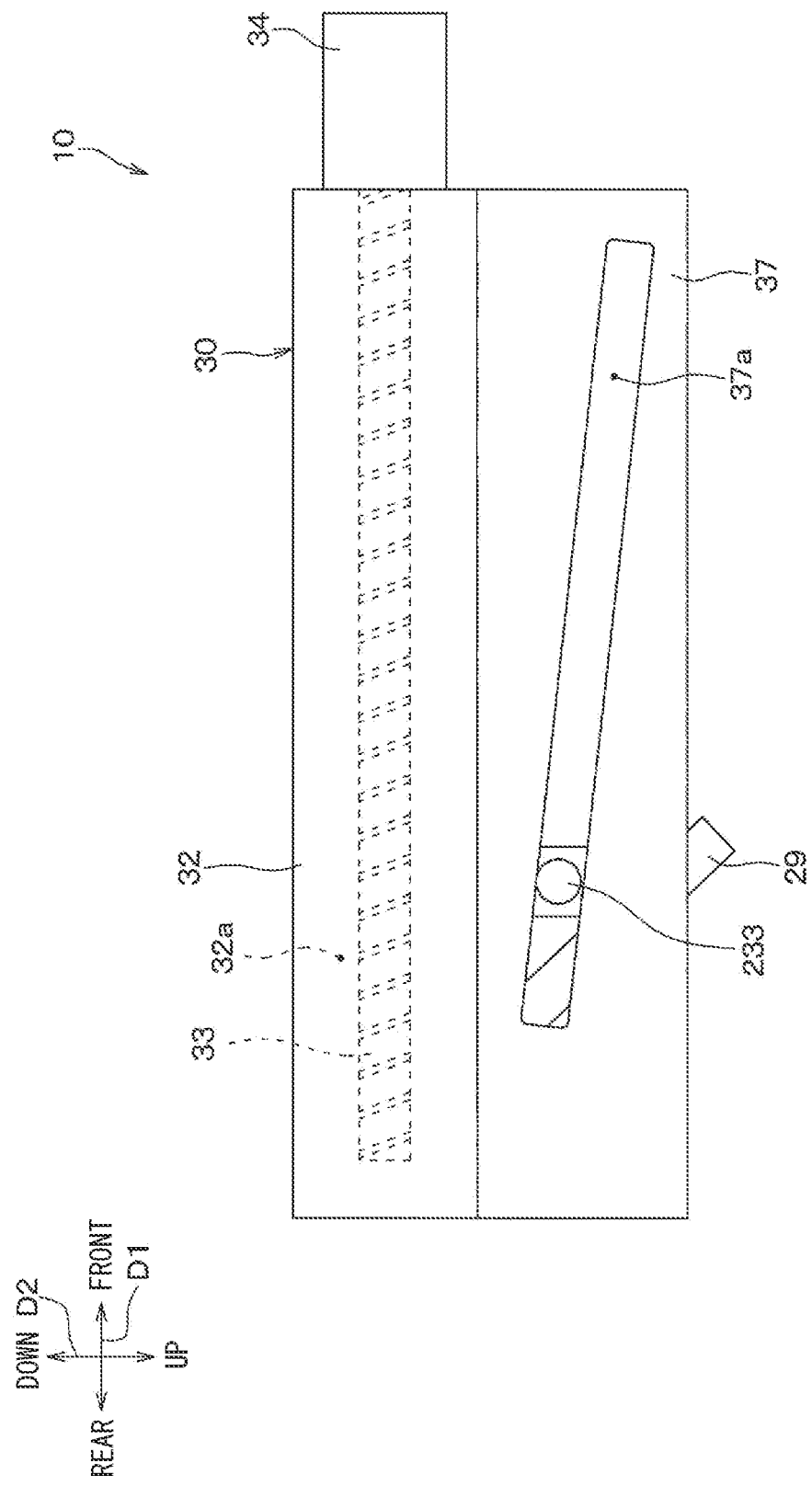
FIG. 7 is a view in a direction of an arrow VII in FIG. 2.

As shown in FIG. 2, FIG. 6, and FIG. 7, the adjusting device 30 has a lower case 32, a front-rear screw actuator 33, a front-rear motor 34, a front-rear moving member 35, and a pair of guides 36 and 37. Moreover, although the support member 23 constitutes a part of the pedal unit 20, it is also included in the adjusting device 30. That is, the support member 23 is shared by the pedal unit 20 and the adjusting device 30.

As shown in FIGS. 2, 6, 7 and 8, the lower case 32 is provided on the vehicle down side to the pedal unit 20. The lower case 32 forms a case space 32a, which is an internal space of the lower case 32, on the vehicle down side with respect to the support member 23. The case space 32a extends in the vehicle front-rear direction D1, and the front-rear screw actuator 33 is arranged in the case space 32a.

For example, in order to match the positions of the lower end portion 211 of the accelerator pedal 21 and the lower end portion 221 (see FIG. 3) of the brake pedal 22 with a floor surface 701 (see FIG. 1) of the vehicle cabin 70a, the adjusting device 30 is arranged such that the lower case 32 is arranged so as to enter the vehicle lower side with respect to the floor surface 701. Also, the lower case 32 is fixed to a body of the vehicle 70.

The front-rear screw actuator 33 extends along the vehicle front-rear direction D1 and is supported on the lower case 32 in a rotatable manner.

The front-rear motor 34 is, e.g., an electric motor such as a stepping motor or a DC motor with an encoder. The front-rear motor 34 is disposed on the vehicle front side with respect to the lower case 32 and is connected to one end 331 arranged on the vehicle front side of the front-rear screw actuator 33. The front-rear motor 34 rotates the front-rear screw actuator 33 in response to the command signal from the control unit 12, and stops the rotation of the front-rear screw actuator 33 at a rotational angle according to the command signal.

The front-rear moving member 35 is arranged on the vehicle rear side with respect to the support member 23. The front-rear moving member 35 is supported by the lower case 32 so as to be movable in the vehicle front-rear direction D1. That is, the front-rear moving member 35 is configured to be guided in the vehicle front-rear direction D1 by the lower case 32.

The front-rear moving member 35 includes a nut portion 351 screwed onto the front-rear screw actuator 33, and a front connecting portion 352 which is a front end portion provided on the vehicle front side of the front-rear moving member 35. The nut portion 351 is arranged in the case space 32a.

A pair of guide portions 36 and 37 are provided on the vehicle up side with respect to the lower case 32, and lower ends of the guide portions 36 and 37 are fixed to the lower case 32. The pair of guide portions 36 and 37 are symmetrical in the vehicle right-left direction D3 with the support member 23 interposed therebetween.

The right guide portion 36 of the pair of guide portions 36 and 37 is arranged on the vehicle right side with respect to the support member 23, the front-rear screw actuator 33 and the front-rear moving member 35. The left guide portion 37 of the pair of guide portions 36 and 37 is arranged on the vehicle left side with respect to the support member 23, the front-rear screw actuator 33 and the front-rear moving member 35.

The right guide portion 36 is formed with a right guide hole 36a penetrating the right guide portion 36 in the vehicle right-left direction D3. Similarly, the left guide portion 37 is formed with a left guide hole 37a penetrating the left guide portion 37 in the vehicle right-left direction D3.

The right guide hole 36a and the left guide hole 37a are each formed to extend in the vehicle front-rear direction D1, but extend at slightly inclined to the vehicle front-rear direction D1. Specifically, each of the right guide hole 36a and the left guide hole 37a extends with respect to the vehicle front-rear direction D1 in an inclined manner so that the more on the vehicle front side is, the more on the vehicle up side. For example, a hole width of the right guide hole 36a is constant over the entire length of the right guide hole 36a, and a hole width of the left guide hole 37a is also constant over the entire length of the left guide hole 37a.

The support member 23 has a base portion 231, a right guided shaft 232 connected to the vehicle right side of the base portion 231, and a left guided shaft 233 connected to the vehicle left side of the base portion 231. The base portion 231 has a flat plate shape whose thickness direction is the vehicle up-down direction D2. The accelerator pedal 21, the brake pedal 22, the accelerator return device 25, the brake return device 26 and the footrest 29 described above are connected to the base portion 231 of the support member 23.

The right guided shaft 232 and the left guided shaft 233 each have a columnar shape having a center on an axis extending in the vehicle right-left direction D3. The right guided shaft 232 is fitted in the right guide hole 36a, and is restrained by the right guide portion 36 so as to be movable along the right guide hole 36a in a longitudinal direction (i.e., extending direction) of the right guide hole 36a. Therefore, a position of the right guided shaft 232 in the vehicle up-down direction D2 (that is, a vertical position of the right guided shaft 232) is determined by the right guide hole 36a.

The left guided shaft 233 is fitted in the left guide hole 37a, and is restrained by the left guide portion 37 so as to be movable along the left guide hole 37a in a longitudinal direction (i.e., extending direction) of the left guide hole 37a. Therefore, a position of the left guided shaft 233 in the vehicle up-down direction D2 (that is, a vertical position of the left guided shaft 233) is determined by the left guide hole 37a.

In addition, the support member 23 has a rotation shaft 234 having a center on the unit rotation axis CL. The base portion 231 of the support member 23 is connected to the front side connecting portion 352 of the front-rear moving member 35 via the rotation shaft 234 thereof. That is, the support member 23 is connected to the front connecting portion 352 as a support member connecting portion so as to be rotatable about the unit rotation axis CL.

The unit rotation axis CL is positioned on the vehicle rear side relative to the right guided shaft 232 and the left guided shaft 233 of the support member 23. The unit rotation axis CL is positioned on the vehicle down side over the entire length of the right guide hole 36a with respect to the right guide hole 36a, and is positioned on the vehicle down side over the entire length of the left guide hole 37a with respect to the left guide hole 37a.

Figure 8:
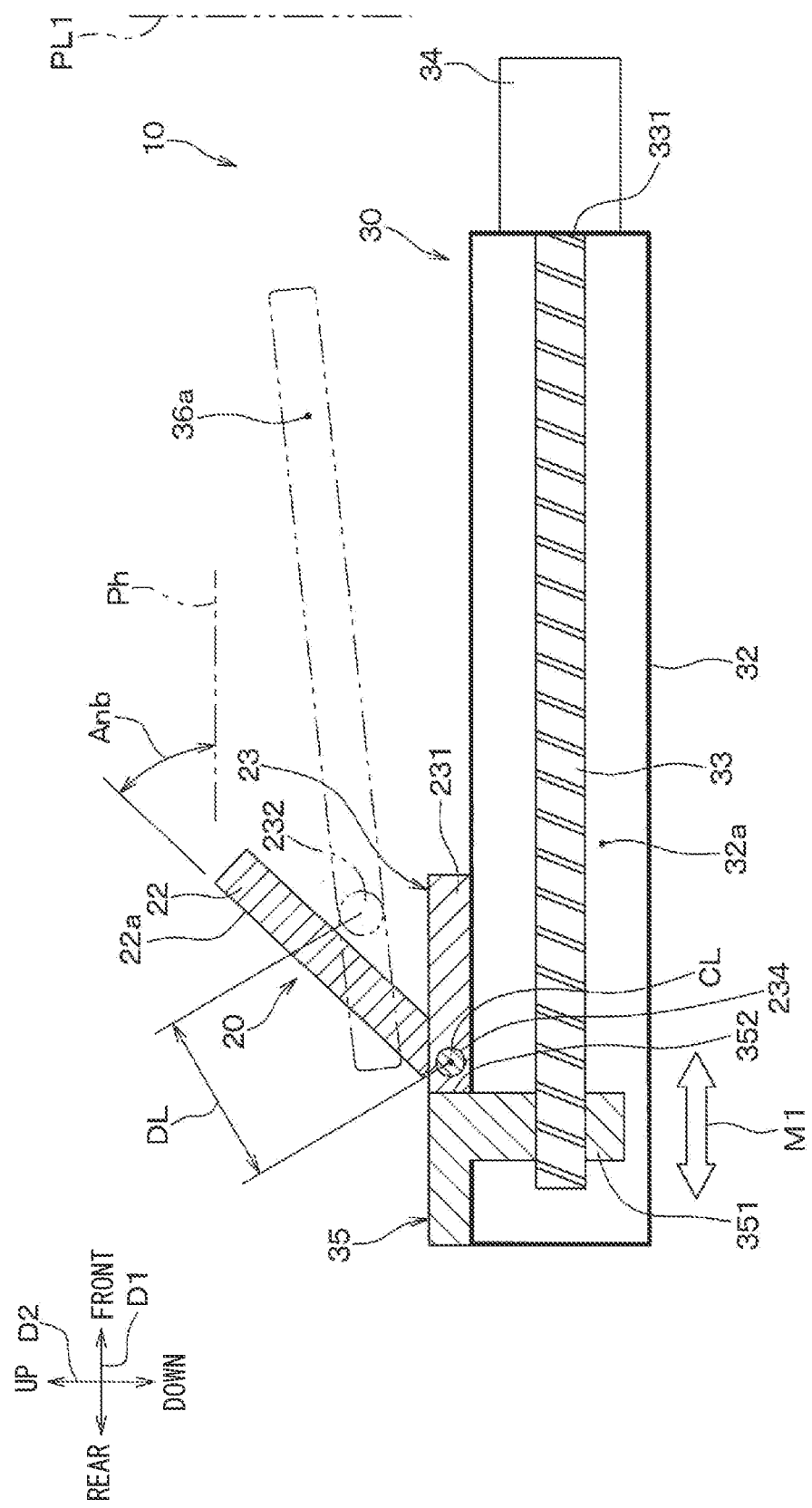
FIG. 8 is a cross-sectional view showing a cross section along a line VIII-VIII in FIG. 2.
Figure 9:
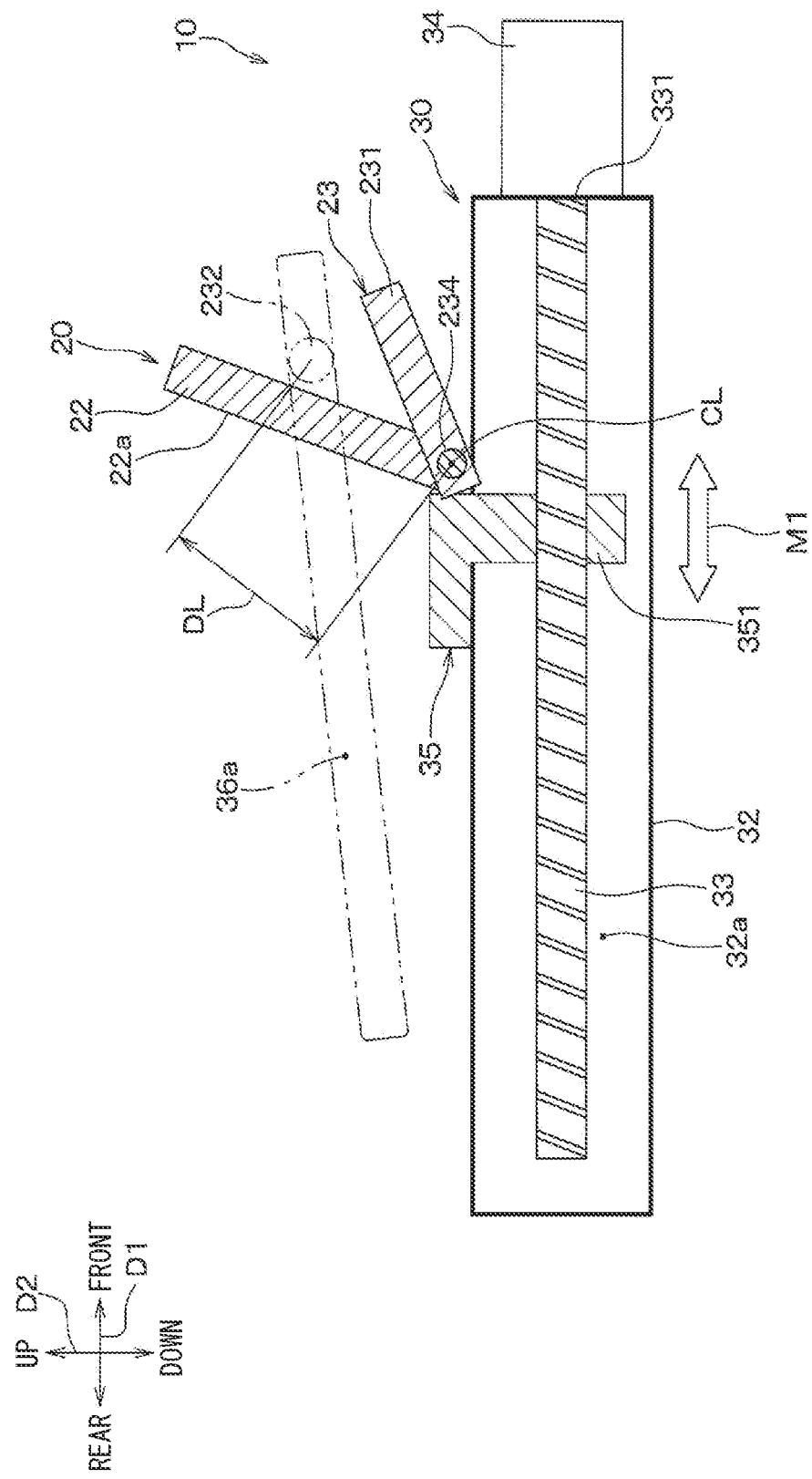
FIG. 9 is a cross-sectional view in the same section of FIG. 8, showing both a condition in which the pedal unit is moved to a vehicle front side with respect to the position of the pedal unit shown in FIG. 8.

In the adjusting device 30 configured as described above, if the front-rear screw actuator 33 is rotated by the front-rear motor 34, the front-rear moving member 35 and the pedal unit 20 move, in accordance with the rotational direction, to the vehicle front side or the vehicle rear side as shown by arrows M1 in FIGS. 8 and 9. At this time, as shown in FIGS. 8 and 9, both a linear distance DL between the unit rotation axis CL and the right guided shaft 232 and a linear distance between the unit rotation axis CL and the left guided shaft 233 obtained in a view along the vehicle right-left direction D3 does not change.

Specifically, each of the right guide hole 36a and the left guide hole 37a extends with respect to the vehicle front-rear direction D1 so that the more the vehicle front side is, the more the vehicle up side. Therefore, the right guided shaft 232 and the left guided shaft 233 are displaced toward the vehicle up side as the pedal unit 20 moves toward the vehicle front side.

As a result, the more the pedal unit 20 moves toward the vehicle front side, the more the pedal unit 20 is inclined so that the vehicle front side of the support member 23 moves toward the vehicle up side with respect to the vehicle rear side. That is, the adjusting device 30 changes the posture of the pedal unit 20 so as to approach a direction of the brake pad surface 22a at the no-brake depressing operation period to a direction of the plane PL1 which has a normal vector direction in the vehicle front-rear direction D1, as the pedal unit 20 is moved toward the vehicle front side. In other words, the adjusting device 30 changes the posture of the pedal unit 20 so as to enlarge a narrow angle Anb formed by the brake pad surface 22a at the no-brake depressing operation period with respect to the horizontal plane Ph of the vehicle 70, as the pedal unit 20 is moved toward the vehicle front side. The plane PL1 is a virtual plane.

At this time, a direction of the accelerator pad surface 21a (see FIG. 3) also changes similar to the direction of the brake pad surface 22a. Therefore, the adjusting device 30 changes the posture of the pedal unit 20 so that the more the pedal unit 20 moves toward the vehicle front side, the more the direction of the accelerator pad surface 21a at the no-accelerator depressing operation period approaches to the direction of the plane PL1. In other words, the adjusting device 30 changes the posture of the pedal unit 20 so as to enlarge the narrow angle Ana (See FIG. 6) formed by the accelerator pad surface 21a at the no-accelerator depressing operation period with respect to the horizontal plane Ph of the vehicle 70, as the pedal unit 20 is moved toward the vehicle front side.

The front-rear motor 34 of the adjusting device 30 functions as an actuator which changes an inclination of the pedal unit 20 in a view along the vehicle right-left direction D3 while moving the pedal unit 20 in the vehicle front-rear direction D1.

FIGS. 2, 6, 7 and 8 show a state in which the pedal unit 20 is positioned at the vehicle most rear side in the movable range of the pedal unit 20 in the vehicle front-rear direction D1. In other words, FIGS. 2, 6, 7 and 8 show the state where the pedal unit 20 is positioned at an end of a stroke on the vehicle rear side when the pedal unit 20 moves in the vehicle front-rear direction D1. FIG. 9 shows a state in which the pedal unit 20 is moved to the vehicle front side with respect to the position of the pedal unit 20 shown in FIG. 8. In FIGS. 8 and 9, the right guided shaft 232 and the right guide hole 36a are shown by dashed lines in order to indicate a track followed by the right guided shaft 232 of the support member 23 as the pedal unit 20 moves.

Further, as described above, in the adjusting device 30, once the unit front-rear position, which is a position of the pedal unit 20 in the vehicle front-rear direction D1, is determined, the inclination of the pedal unit 20 in a view along the vehicle right-left direction D3 is also determined. That is, it can be said that the adjusting device 30 determines the inclination of the pedal unit 20 according to the unit front-rear position in accordance with a predetermined relationship between the unit front-rear position and the inclination of the pedal unit 20. The right guide hole 36a and the left guide hole 37a of the adjusting device 30 predetermine the relationship between the unit front-rear position and the inclination of the pedal unit 20.

As shown in FIG. 5, the control device 12 of the pedal device 10 outputs an electric signal to the front-rear motor 34 of the adjusting device 30 to command the front-rear motor 34 to rotate or stop in order to control the adjusting device 30. The control unit 12 is electrically connected to an operation panel 80, which can be operated by the passenger 72, and a sensing device 81.

The operation panel 80 is an input device operated by the passenger 72, and is provided, e.g., in the vehicle cabin 70a. The operation panel 80 includes a front button 801, a rear button 802, a first button 803, a second button 804 and a sensing button 805 which are pushed by the passenger 72.

For example, if the front button 801 is pushed by the passenger 72, the operation panel 80 continuously outputs an electric signal indicative of pushing the front button 801 to the control unit 12 until the front button 801 is released. Then, if the front button 801 is released, the operation panel 80 stops outputting the electrical signal indicative of pushing the front button 801. The control unit 12 operates the front-rear motor 34 to move the pedal unit 20 to the vehicle front side in the movable range of the pedal unit 20 while the electric signal indicative of pushing the front button 801 is obtained.

If the rear button 802 is pushed by the passenger 72, the operation panel 80 continuously outputs an electric signal indicative of pushing the rear button 802 to the control unit 12 until the rear button 802 is released. Then, if the rear button 802 is released, the operation panel 80 stops outputting the electrical signal indicative of pushing the rear button 802. The control unit 12 operates the front-rear motor 34 to move the pedal unit 20 to the vehicle rear side in the movable range of the pedal unit 20 while the electric signal indicative of pushing the rear button 802 is obtained.

Processing of the control unit 12 when the first button 803, the second button 804, or the sensing button 805 is pushed is described later with reference to FIG. 10.

The sensing device 81 is configured of one or more devices such as a camera, and an optical sensor, which capture an image of the passenger 72 seated, and a pressure sensor, which is provided in the seat and can measure a weight of the passenger 72, and the like. The sensing device 81 senses a physique of the passenger 72 and outputs to the control unit 12 an electrical signal indicative of information obtained by the sensing operation about the physique of the occupant 72, i.e., the sensing information. The sensing information includes information which makes possible to estimate a height and a weight of the passenger 72, for example.

Figure 10:
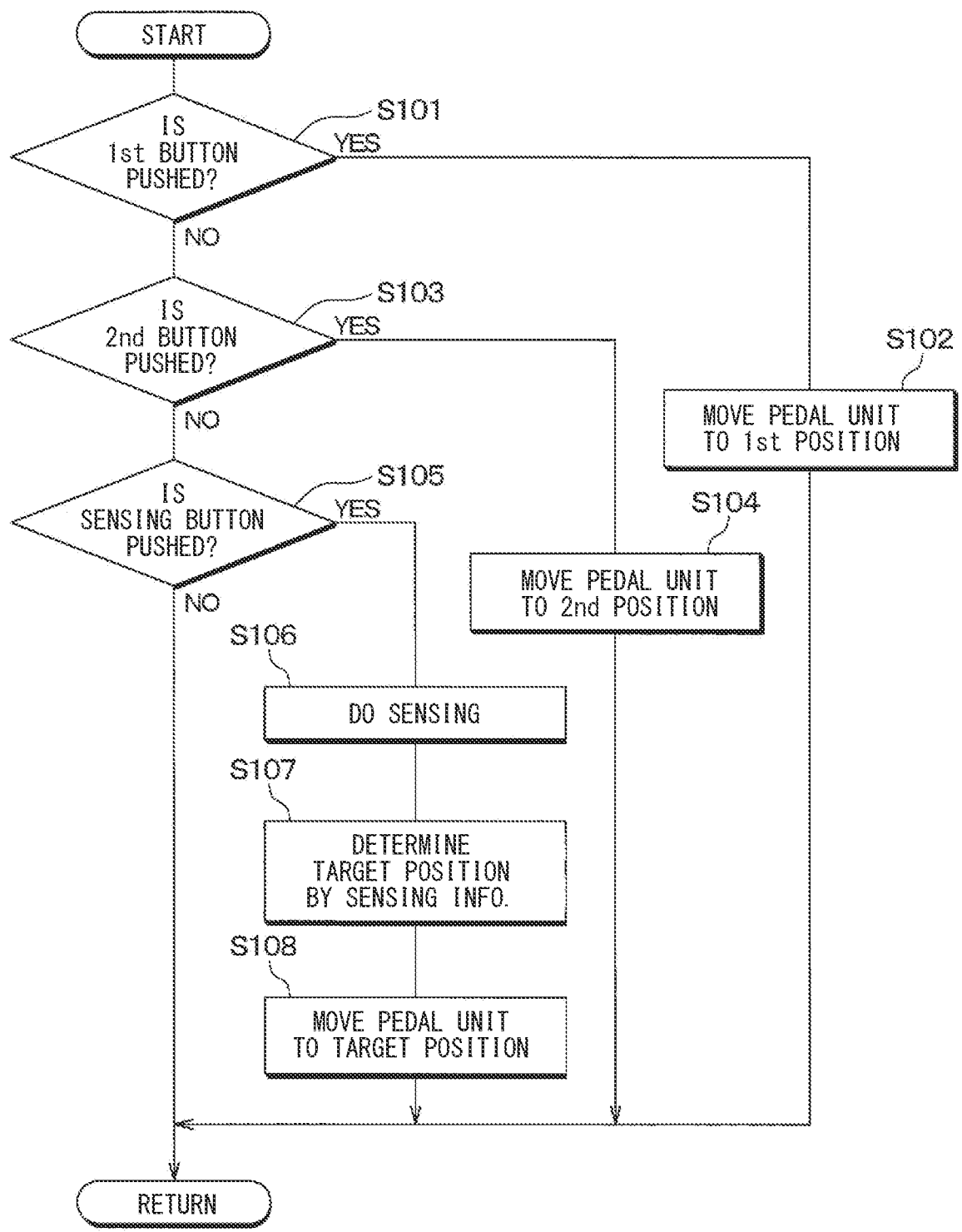
FIG. 10 is a flowchart showing control processing executed by a control unit of the first embodiment.

FIG. 10 is a flowchart showing control processing executed by a control unit 12 of this embodiment. The control processing of FIG. 10 is periodically and repeatedly executed.

As shown in FIG. 10, the control unit 12 first determines whether or not the first button 803 of the operation panel 80 is pushed by the passenger 72 in a step S101. For example, if the first button 803 is pushed by the passenger 72, the operation panel 80 outputs an electrical signal indicative of pushing the first button 803 to the control unit 12. Then, the control unit 12 determines that the first button 803 is pushed by the passenger 72, if it receives an electric signal indicative of pushing the first button 803.

If it is determined in the step S101 that the first button 803 is pushed, the process proceeds to a step S102. On the other hand, if it is determined that the first button 803 is not pushed, the process proceeds to a step S103.

In the step S102, the control unit 12 operates the front-rear motor 34 of the adjusting device 30 to move the pedal unit 20 so that the unit front-rear position of the pedal unit 20 reaches a first target position.

Here, the control unit 12 preliminarily stores a plurality of targets of the position or the posture of the pedal unit 20 as target installation positions, the plurality of target installation positions are associated with a plurality of switches such as the first button 803 and the second button 804 on the operation panel 80. The first target position described above is one of the plurality of target installation states, and is stored in the control unit 12 in association with the first button 803. A second target position, which is described later, is also one of the plurality of target installation states, and is stored in the control unit 12 in association with the second button 804.

In this embodiment, if the unit front-rear position is determined, since the inclination of the pedal unit 20, i.e., the posture of the pedal unit 20 is also determined, the plurality of target installation state are configured by a first target position and a second target position which are targets of the unit front-rear position. The target installation state is a target position of the pedal unit 20 and a target posture of the pedal unit 20.

In the step S103, the control unit 12 determines whether or not the second button 804 of the operation panel 80 is pushed by the passenger 72. For example, if the second button 804 is pushed by the passenger 72, the operation panel 80 outputs an electrical signal indicative of pushing the second button 804 to the control unit 12. Then, the control unit 12 determines that the second button 804 is pushed by the passenger 72, if it receives an electric signal indicative of pushing the second button 804.

If it is determined in the step S103 that the second button 804 is pushed, the process proceeds to a step S104. On the other hand, if it is determined that the second button 804 is not pushed, the process proceeds to a step S105.

In the step S104, the control unit 12 operates the front-rear motor 34 of the adjusting device 30 to move the pedal unit 20 so that the unit front-rear position of the pedal unit 20 reaches a second target position.

As understandable from the steps S101, S102, S103 and S104 above, the passenger 72 may select any of the plurality of target installation positions by pushing the first button 803 or the second button 804, which are the first target position and the second target position. If a selection is made, the control unit 12 causes the adjusting device 30 to adjust the position or the posture of the pedal unit 20 so that the position or the posture of the pedal unit 20 becomes the target installation state selected from among a plurality of states.

In the step S105 in FIG. 10, the control unit 12 determines whether or not the sensing button 805 of the operation panel 80 is pushed by the passenger 72. For example, if the sensing button 805 is pushed by the passenger 72, the operation panel 80 outputs an electrical signal indicative of pushing the sensing button 805 to the control unit 12. Then, the control unit 12 determines that the sensing button 805 is pushed by the passenger 72, if it receives an electric signal indicative of pushing the sensing button 805.

If it is determined in the step S105 that the sensing button 805 is pushed, the process proceeds to a step S106. On the other hand, if it is determined that the sensing button 805 is not pushed, the flowchart in FIG. 10 ends and starts again from the step S101.

In the step S106, the control unit 12 controls the sensing device 81 to sense the physique of the passenger 72, and acquires sensing information from the sensing device 81 obtained by sensing. After the step S106, the process proceeds to a step S107.

In the step S107, the control unit 12 estimates the physique of the passenger 72, such as a height and weight of the passenger 72 based on the sensing information acquired in the step S106. Estimating the physique of the passenger 72 is performed by using, e.g., a physique estimation map in which a relationship between the sensing information obtained from the sensing device 81 and the physique of the passenger 72 is determined experimentally in advance.

After estimating the physique of the passenger 72, the control unit 12 determines a sensing target position based on the physique of the passenger 72 by using a front-rear position map predetermined which is predetermined as a relationship between the physique of the passenger 72 and the unit front-rear position of the pedal unit 20. The sensing target position is a target of a unit front-rear position which is determined when the physique of the passenger 72 is sensed. For example, according to the front-rear position map, the shorter the passenger 72 is, the closer the sensing target position is to a position on the vehicle rear side as indicated by an arrow A1 in FIG. 1. After the step S107 in FIG. 10, the process proceeds to a step S108.

In the step S108, the control unit 12 operates the front-rear motor 34 of the adjusting device 30 to move the pedal unit 20 so that the unit front-rear position of the pedal unit 20 reaches a sensing target position. In short, the control unit 12 controls the adjusting device 30 to adjust the position or the posture of the pedal unit 20 based on the sensing information.

If the processing of the steps S102, S104, and S108 is finished, the flowchart of FIG. 10 ends and starts again from the step S101.

Processing in each step in FIG. 10 described above configure functional units which achieve corresponding functions. The same applies to the other flowchart described later.

According to this embodiment, as shown in FIG. 4, the pedal unit 20 includes the brake pedal 22 which transmits the brake pedal operation amount Qbr as the electric signal, and the accelerator pedal 21 which transmits the accelerator pedal operation amount Qac as the electric signal. As shown in FIGS. 2, 6, 7, 8 and 9, the pedal device 10 includes an adjusting device 30 which adjusts the position or the posture of the pedal unit 20.

Therefore, in the pedal device 10 of this embodiment, there are fewer mechanical restrictions on changes in the position or the posture of the pedal unit 20 in comparison with, e.g., a configuration in which the brake pedal operation amount Qbr is mechanically transmitted to the master cylinder. Therefore, it is possible to easily enlarge an adjustable range of the position or the posture of the pedal unit 20.

Further, if the adjusting range of the position or the posture of the pedal unit 20 can be sufficiently expanded, it is possible to optimize the position or the posture of the pedal unit 20 according to the physique of the passenger 72 as the driver.

(1) As described above, according to this embodiment, the adjusting device 30 performs adjusting the position or the posture of the pedal unit 20 which includes adjusting a position of the pedal unit 20 in the vehicle front-rear direction D1. Therefore, there is an advantage that a position of the accelerator pedal 21 and the brake pedal 22 in the vehicle front-rear direction D1 can be easily matched with the physique of the passenger 72, in comparison with a vehicle in which a position adjustment of the pedal unit 20 in the vehicle front-rear direction D1 is not possible.

(2) As described above, according to this embodiment, the adjusting device 30 performs adjusting the position or the posture of the pedal unit 20 which includes adjusting an inclination of the pedal unit 20 in a view along the vehicle right-left direction D3. Therefore, there is an advantage that directions of the accelerator pedal 21 and the brake pedal 22 can be easily matched with the physique of the passenger 72 in comparison with a vehicle in which an inclination of the pedal unit 20 cannot be adjusted.

(3) Here, since the pedal unit 20 is arranged near the feet of the passenger 72, there are many components of the vehicle body that are arranged close to the pedal unit 20 around the pedal unit 20. In contrast, according to this embodiment, the adjusting device 30 determines the inclination of the pedal unit 20 according to the unit front-rear position in accordance with a predetermined relationship between the unit front-rear position of the pedal unit 20 and the inclination of the pedal unit 20.

Therefore, it is possible to increase an adjustable range of the position or the posture of the pedal unit 20 while avoiding interference between the pedal unit 20 and components of the vehicle body around the pedal unit 20 under a space relation to arrange the pedal unit 20.

(4) Further, according to this embodiment, the adjustment device 30 approaches the direction of the accelerator pad surface 21a at the no-accelerator depressing operation period to a direction of the plane PL1 which has a normal vector direction in the vehicle front-rear direction D1, as the pedal unit 20 is moved toward the vehicle front side. In the case focusing on the brake pedal 22, the adjusting device 30 approach a direction of the brake pad surface 22a at the no-brake depressing operation period to the direction of the plane PL1, as the pedal unit 20 is moved toward the vehicle front side. The adjusting device 30 thus changes the posture of the pedal unit 20.

Therefore, it is possible to adjust the optimum position and posture of the pedal unit 20 which matches the physique of the passenger 72 by determining one of the position and the posture of the pedal unit 20. Ultimately, this leads to simplification of the mechanical structure of the adjusting device 30.

(5) Further, according to this embodiment, the adjusting device 30 has the front-rear motor 34 which is a single actuator to change the inclination of the pedal unit 20 while moving the pedal unit 20 in the vehicle front-rear direction D1. Therefore, it is possible to simplify a structure of the adjusting device 30 in comparison with the case in which a motor for adjusting the position of the pedal unit 20 and a motor for adjusting the inclination of the pedal unit 20 are individually disposed. This leads to cost reduction of the pedal device 10.

(6) In addition, according to this embodiment, the right guide hole 36a and the left guide hole 37a in the adjusting device 30 are extended with respect to the vehicle front-rear direction D1 in an inclined manner so that the more on the vehicle front side is, the more on the vehicle up side. The support member 23 also has a right guided shaft 232 fitted in the right guide hole 36a and a left guided shaft 233 fitted in the left guide hole 37a. Further, the support member 23 is connected to the front connecting portion 352 of the front-rear moving member 35 so as to be rotatable about the unit rotation axis CL. Further, the up-down position of the right guided shaft 232 is determined by the right guide hole 36a, and the up-down position of the left guided shaft 233 is determined by the left guide hole 37a.

Therefore, it is possible to adjust both the position and the posture of the pedal unit 20 by providing a single one of the front-rear motor 34 which moves the pedal unit 20 in the vehicle front-rear direction D1 without a dedicated motor for adjusting the posture of the pedal unit 20.

(7) Further, according to the present embodiment, as shown in FIGS. 5 and 10, the control section 12 stores in advance a plurality of target positions or postures of the pedal unit 20 as target installation states. The control unit 12 controls the adjusting device 30 to adjust the position or the posture of the pedal unit 20 so that the position or the posture of the pedal unit 20 becomes the target installation state selected from among a plurality of states. Therefore, it is possible to efficiently adjust the position or the posture of the pedal unit 20.

(8) Further, according to this embodiment, the control unit 12 controls the sensing device 81 to sense the physique of the passenger 72, and controls the adjusting device 30 to adjust the position or the posture of the pedal unit 20 based on the sensing information obtained by the sensing operation. This makes it possible to automate an adjustment of the position or the posture of the pedal unit 20.

(9) According to this embodiment, as shown in FIGS. 2, 3 and 8, the accelerator pedal 21 and the brake pedal 22 are the organ-type pedals. Therefore, it is easy to employ a mechanical structure in which most of components constituting the adjusting device 30 are arranged on the vehicle down side with respect to the accelerator pedal 21 and the brake pedal 22. Therefore, it is easy to unitize the pedal unit 20 and the adjusting device 30 compactly.

(10) Further, according to this embodiment, the pedal unit 20 includes a footrest 29, as shown in FIGS. 2 and 3. Therefore, it is possible to improve comfort of the passenger 72 in comparison with the case where the footrest 29 is not provided. It is possible to adjust the position and posture of the footrest 29 at the same time as the position and postures of the accelerator pedal 21 and the brake pedal 22 are adjusted.

Further, according to this embodiment, as shown in FIGS. 2 and 8, the adjusting device 30 changes the inclination of the pedal unit 20 by rotating the support member 23 around the unit rotation axis CL extending in the vehicle right-left direction D3. As the pedal unit 20 is moved by the adjusting device 30 in the vehicle front-rear direction D1, the unit rotation axis CL moves linearly along the vehicle front-rear direction D1 together with the support member 23. Therefore, it is possible to change the inclination of the pedal unit 20 while preventing the support member 23 from separating from the floor surface 701 (see FIG. 1) of the vehicle cabin 70a toward the vehicle up side.

Second Embodiment

A second embodiment of the present disclosure is described next. This embodiment is explained mainly with respect to points different from those of the first embodiment. In addition, explanations of the same or equivalent portions as those in the above embodiment is omitted or simplified. The same applies to a description of the embodiments described later.

Figure 11:
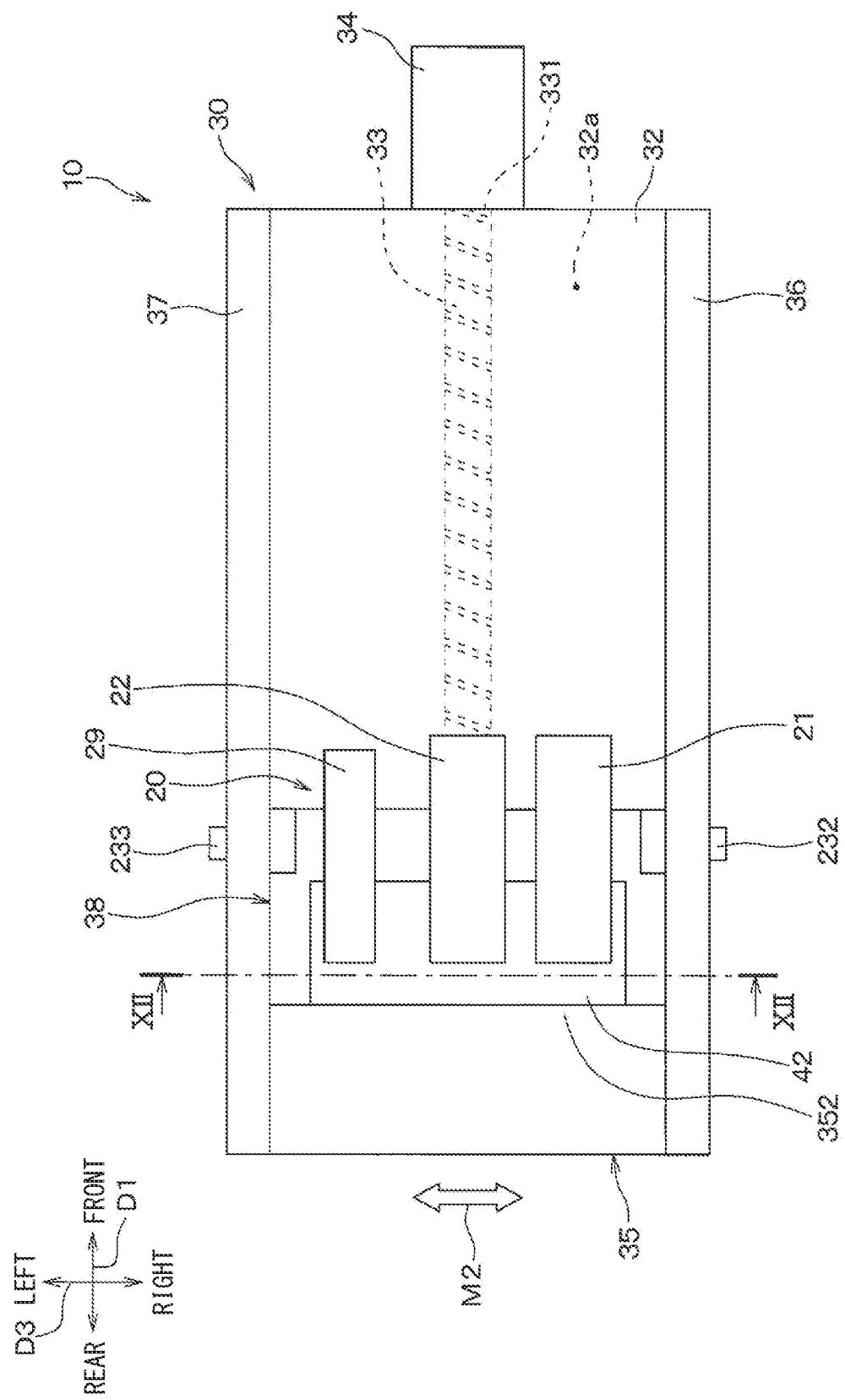
FIG. 11 is a top view schematically showing a pedal unit and an adjusting device included in a pedal device viewed in a direction from a vehicle up side toward a vehicle down side according to a second embodiment, and corresponds to FIG. 2.
Figure 12:
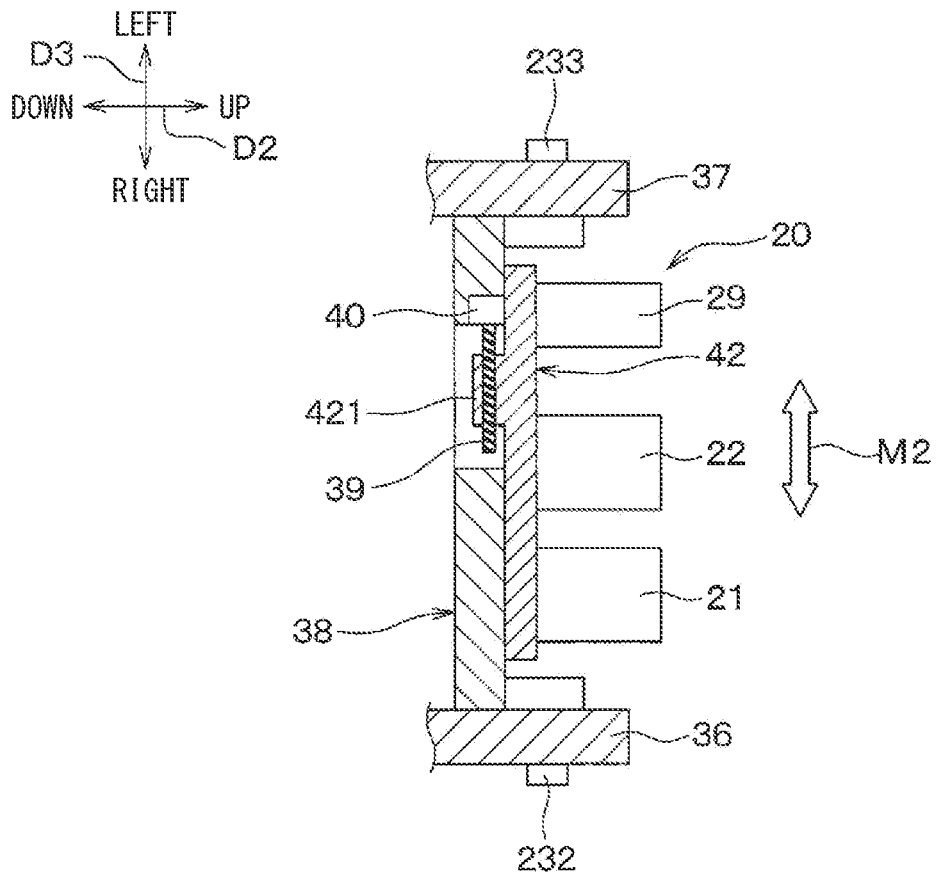
FIG. 12 is a cross-sectional view showing a cross section along a line XII-XII in FIG. 11.

As shown in FIG. 11 and FIG. 12, the adjusting device 30 of this embodiment has a function of moving the pedal unit 20 in the vehicle front-rear direction D1 and a function of inclining the pedal unit 20 similar to the first embodiment. In addition, unlike the first embodiment, the adjusting device 30 of this embodiment has a function of moving the pedal unit 20 in the vehicle right-left direction D3. That is, the adjustment of the position or the posture of the pedal unit 20 performed by the adjusting device 30 includes an adjusting the position of the pedal unit 20 in the vehicle right-left direction D3.

Specifically, in this embodiment, the adjusting device 30 includes the lower case 32, the front-rear screw actuator 33, the front-rear motor 34, the front-rear moving member 35, and the pair of guides 36 and 37, and further includes a swing member 38, a right-left screw actuator 39 and a right-left motor 40.

Further, the pedal unit 20 of this embodiment has the support member 42 of this embodiment instead of the support member 23 of the first embodiment. Unlike the support member 23 of the first embodiment, the support member 42 of this embodiment does not have the right guided shaft 232, the left guided shaft 233, and the rotation shaft 234 (see FIG. 8). The support member 42 of this embodiment is the same as the support member 23 of the first embodiment, except as described in the description of this embodiment. Thus, for example, the accelerator pedal 21 is connected to the support member 42 at a lower end 211 of the accelerator pedal 21 and the brake pedal 22 is connected to the support member 42 at a lower end 221 of the brake pedal 22. The footrest 29 is connected to the support member 42 at a lower end 291 of the footrest 29.

Further, the support member 42 of this embodiment is arranged so as to be stacked on the vehicle up side with respect to the swing member 38. The support member 42 is supported by the swing member 38 so as to be movable in the vehicle right-left direction D3. That is, the support member 42 is configured to be guided in the vehicle right-left direction D3 by the swing member 38. Therefore, the pedal unit 20 swings integrally with the swing member 38 about the unit rotation axis CL (see FIG. 8).

Further, the support member 42 has a nut portion 421 screwed onto the right-left screw actuator 39 on the vehicle lower side of the support member 42. The nut portion 421 of the support member 42 is arranged so as to enter a through hole provided in the swing member 38.

On the other hand, the swing member 38 in this embodiment has the right guided shaft 232, the left guided shaft 233, and the rotation shaft 234 similar to the support member 23 of the first embodiment. Therefore, similarly to the support member 23 of the first embodiment, the swing member 38 is connected to, e.g., the front connecting portion 352 of the front-rear moving member 35 so as to be rotatable about the unit rotation axis CL (see FIG. 8). Further, the inclination of the support member 42 of the pedal unit 20 (i.e., the posture of the support member 42) is not directly restrained by the pair of guide portions 36 and 37 (see FIGS. 6 and 7), but is indirectly restrained via the swing member 38.

The right-left screw actuator 39 extends along the vehicle right-left direction D3 and is supported on the swing member 38 in a rotatable manner.

The right-left motor 40 is an electric motor similar to the front-rear motor 34. The right-left motor 40 is fixed to the swing member 38, and one end of the right-left screw actuator 39 is connected to the right-left motor 40. The right-left motor 40 rotates the right-left screw actuator 39 in response to the command signal from the control unit 12 in FIG. 13, and stops the rotation of the right-left screw actuator 39 at a rotational angle according to the command signal.

In the adjusting device 30 of this embodiment, if the right-left screw actuator 39 is rotated by the right-left motor 40, the pedal unit 20 including the support member 42 moves, in accordance with the rotational directions, either to the vehicle right side or to the vehicle left side with respect to the swing member 38 as shown by an arrow M2.

Figure 13:
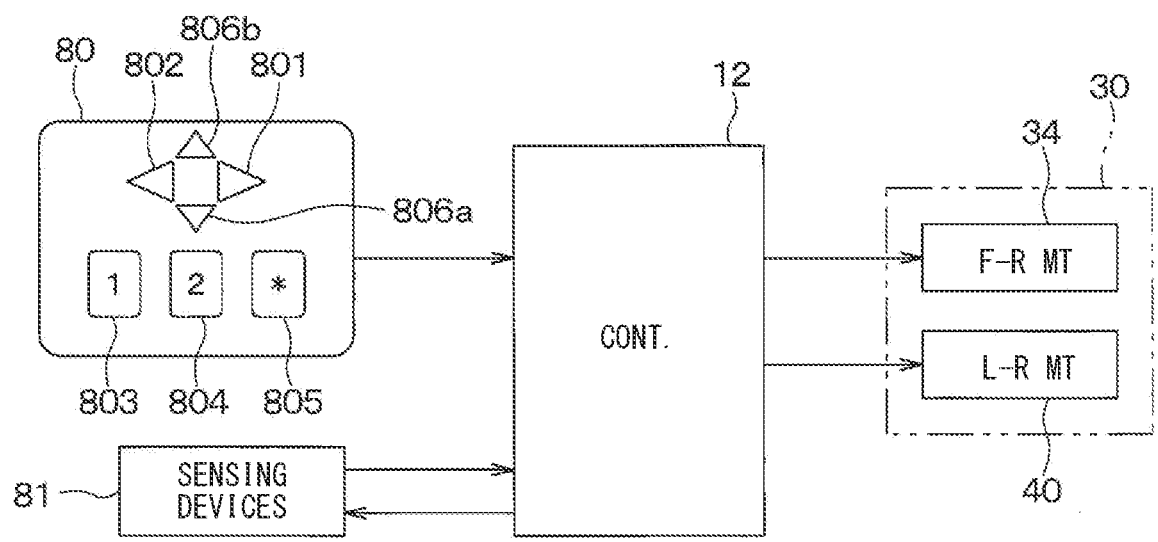
FIG. 13 is a block diagram relating to control of the adjusting device of the second embodiment, and corresponds to FIG. 5.

For example, as shown in FIG. 13, the operation panel 80 of this embodiment includes the front button 801, the rear button 802, the first button 803, the second button 804, and the sensing button 805, and further includes a right button 806a, and a left button 806b. The right button 806a and the left button 806b are operation buttons that are pushed by the passenger 72 when the passenger 72 adjusts a right-left position of the pedal unit 20. The control unit 12 operates the right-left motor 40 in accordance with operation of the right button 806a or the left button 806b by the passenger 72.

For example, the control unit 12 operates the right-left motor 40 according to the passenger's operation of the right button 806*a* or the left button 806*b* similar to the operation for the front-rear motor 34 according to the passenger's operation of the front button 801 or the rear button 802 described above. That is, the control unit 12 operates the right-left motor 40 to move the pedal unit 20 to the vehicle right side in the movable range of the pedal unit 20 while the right button 806*a* is pushed. The control unit 12 operates the right-left motor 40 to move the pedal unit 20 to the vehicle left side in the movable range of the pedal unit 20 while the left button 806*b* is pushed.

With such a configuration, the adjusting device 30 of this embodiment has a function of moving the pedal unit 20 in the vehicle right-left direction D3.

(1) As described above, according to this embodiment, the adjusting device 30 performs adjusting the position or the posture of the pedal unit 20 which includes adjusting a position of the pedal unit 20 in the vehicle right-left direction D3. Therefore, there is an advantage that a position of the accelerator pedal 21 and the brake pedal 22 in the vehicle right-left direction D3 can be easily matched with the physique of the passenger 72 in comparison with a vehicle in which a position adjustment of the pedal unit 20 in the vehicle right-left direction D3 is not possible.

This embodiment is similar to the first embodiment, except for the above described aspects. Thus, this embodiment can achieve the advantages obtained by the configuration common to the first embodiment described above in a similar manner as in the first embodiment.

Third Embodiment

A third embodiment is described next. This embodiment is explained mainly with respect to points different from those of the first embodiment.

Figure 14:
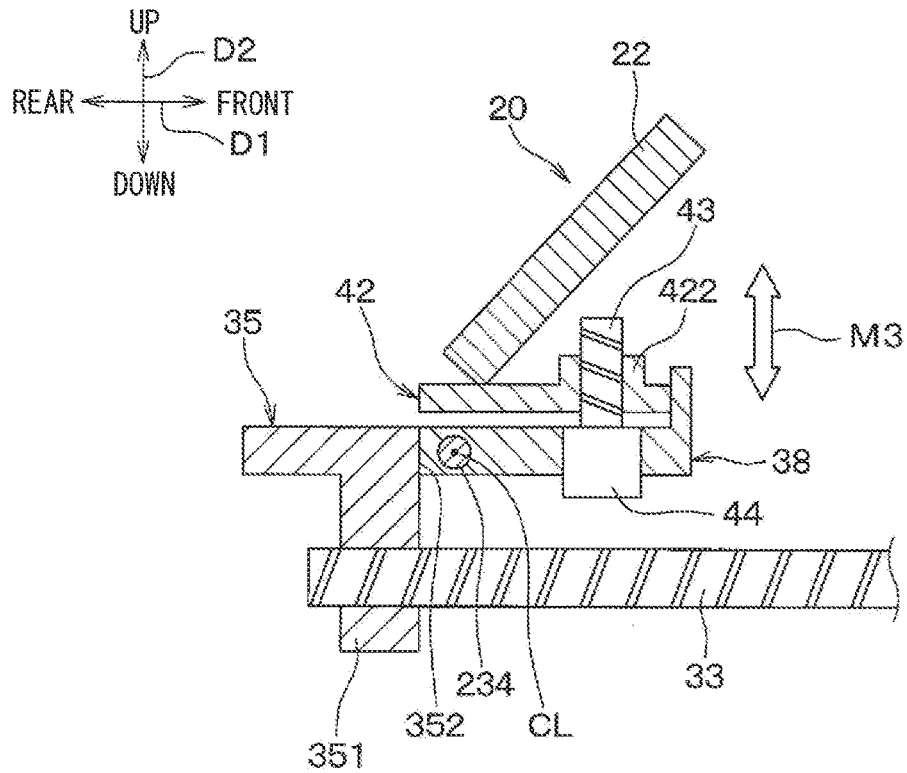
FIG. 14 is a cross-sectional view showing a cross section corresponding to the line VIII-VIII in FIG. 2 according to a third embodiment, and is a diagram showing the pedal unit and its surroundings in an excerpted manner.

As shown in FIG. 14, the adjusting device 30 of this embodiment has a function of moving the pedal unit 20 in the vehicle front-rear direction D1 and a function of inclining the pedal unit 20 similar to the first embodiment. In addition, unlike the first embodiment, the adjusting device 30 of this embodiment has a function of moving the pedal unit 20 in the vehicle up-down direction D2. That is, the adjusting device 30 performs adjusting the position or the posture of the pedal unit 20 which includes adjusting a position of the pedal unit 20 in the vehicle up-down direction D2.

Specifically, in this embodiment, the adjusting device 30 includes the lower case 32, the front-rear screw actuator 33, the front-rear motor 34, the front-rear moving member 35, and the pair of guides 36 and 37, and further includes a swing member 38, an up-down screw actuator 43 and an up-down motor 44.

Further, the pedal unit 20 of this embodiment has the support member 42 of this embodiment instead of the support member 23 of the first embodiment. Unlike the support member 23 of the first embodiment, the support member 42 of this embodiment does not have the right guided shaft 232, the left guided shaft 233, and the rotation shaft 234 (see FIG. 8). The support member 42 of this embodiment is the same as the support member 23 of the first embodiment, except as described in the description of this embodiment. Thus, for example, the accelerator pedal 21 is connected to the support member 42 at the lower end 211 of the accelerator pedal 21 and the brake pedal 22 is connected to the support member 42 at the lower end 221 of the brake pedal 22. The footrest 29 is connected to the support member 42 at a lower end 291 of the footrest 29.

The up-down screw actuator 43 extends in the vehicle up-down direction D2 and is supported on the swing member 38 in a rotatable manner. Since the swing member 38 of this embodiment swings about the unit rotation axis CL, the up-down screw actuator 43 also swings together with the swing member 38 about the unit rotation axis CL. For example, the up-down screw actuator 43 is supported on the swing member 38 so that an extending direction of the up-down screw actuator 43 extends along the vehicle up-down direction D2 in the case that the pedal unit 20 is positioned at the vehicle most rear side in the movable range of the pedal unit 20 in the vehicle front-rear direction D1. In the adjusting device 30 of this embodiment, the extending direction of the up-down screw actuator 43 may be slightly inclined with respect to the vehicle up-down direction D2 due to a swing motion of the swing member 38, but the extending direction of the up-down screw actuator 43 still extends along the vehicle up-down direction D2.

Further, the support member 42 of this embodiment is arranged so as to be stacked on the vehicle up side with respect to the swing member 38. The support member 42 is supported on the swinging member 38 so as to be movable in the extending direction of the up-down screw actuator 43. That is, the support member 42 is configured to be guided in the extending direction of the up-down screw actuator 43 by the swing member 38. Therefore, the pedal unit 20 swings integrally with the swing member 38 about the unit rotation axis CL (see FIG. 8).

The support member 42 also has a nut portion 422 screwed into the up-down screw actuator 43.

In this embodiment, the swing member 38 has the right guided shaft 232, the left guided shaft 233, and the rotation shaft 234 similar to the support member 23 of the first embodiment. Therefore, similarly to the support member 23 of the first embodiment, the swing member 38 is connected to, e.g., the front connecting portion 352 of the front-rear moving member 35 so as to be rotatable about the unit rotation axis CL (see FIG. 8). Further, the inclination of the support member 42 of the pedal unit 20 (i.e., the posture of the support member 42) is not directly restrained by the pair of guide portions 36 and 37 (see FIGS. 6 and 7), but is indirectly restrained via the swing member 38.

The up-down motor 44 is an electric motor similar to the front-rear motor 34. The up-down motor 44 is fixed to the swing member 38, and one end of the up-down screw actuator 43 is connected to the up-down motor 44. The up-down motor 44 rotates the up-down screw actuator 43 in response to the command signal from the control unit 12 in FIG. 15, and stops the rotation of the up-down screw actuator 43 at a rotational angle according to the command signal.

In the adjusting device 30 of this embodiment, if the up-down screw actuator 43 is rotated by the up-down motor 44, the pedal unit 20 including the support member 42 moves, in accordance with the rotational directions, either to the vehicle up side or to the vehicle down side with respect to the swing member 38 as shown by the arrow M3.

Figure 15:
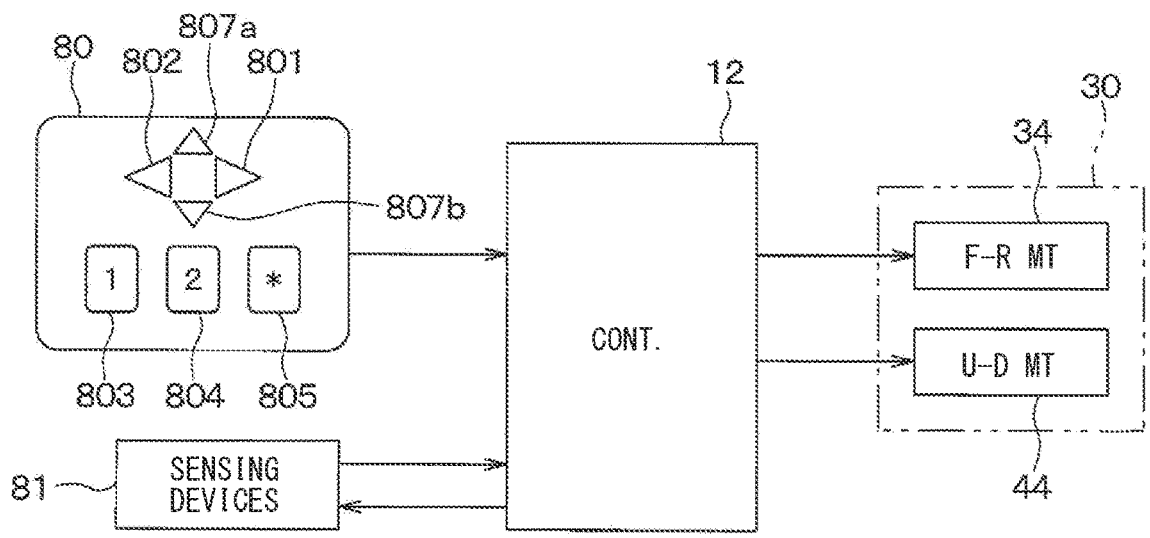
FIG. 15 is a block diagram relating to control of the adjusting device of the third embodiment, and corresponds to FIG. 5.

For example, as shown in FIG. 15, the operation panel 80 of this embodiment includes the front button 801, the rear button 802, the first button 803, the second button 804, and the sensing button 805, and further includes an up button 807*a*, and a down button 807*b*. The up button 807*a* and the down button 807*b* are operation buttons that are pushed by the passenger 72 when the passenger 72 adjusts an up-down position of the pedal unit 20. The control unit 12 operates the up-down motor 44 according to the operation of the up button 807*a* or the down button 807*b* by the passenger 72.

For example, the control unit 12 operates the up-down motor 44 according to the passenger's operation of the up button 807a or the down button 807b similar to the operation for the front-rear motor 34 according to the passenger's operation of the front button 801 or the rear button 802 described above. That is, the control unit 12 operates the up-down motor 44 to move the pedal unit 20 to the vehicle up side in the movable range of the pedal unit 20 while the up button 807a is pushed. That is, the control unit 12 operates the up-down motor 44 to move the pedal unit 20 to the vehicle down side in the movable range of the pedal unit 20 while the down button 807b is pushed.

With such a configuration, the adjusting device 30 of this embodiment has a function of moving the pedal unit 20 in the vehicle up-down direction D2.

(1) As described above, according to this embodiment, adjusting the position or the posture of the pedal unit 20 performed by the adjusting device 30 includes adjusting the position of the pedal unit 20 in the vehicle up-down direction D2. Therefore, there is an advantage that a position of the accelerator pedal 21 and the brake pedal 22 in the vehicle up-down direction D2 can be easily matched with the physique of the passenger 72 in comparison with a vehicle in which a position adjustment of the pedal unit 20 in the vehicle up-down direction D2 is not possible.

This embodiment is similar to the first embodiment, except for the above described aspects. Thus, this embodiment can achieve the advantages obtained by the configuration common to the first embodiment described above in a similar manner as in the first embodiment.

Note that this embodiment is a modification based on the first embodiment, but it is possible to combine this embodiment with the second embodiment described above.

Fourth Embodiment

A fourth embodiment is described next. This embodiment is explained mainly with respect to points different from those of the first embodiment.

Figure 16:
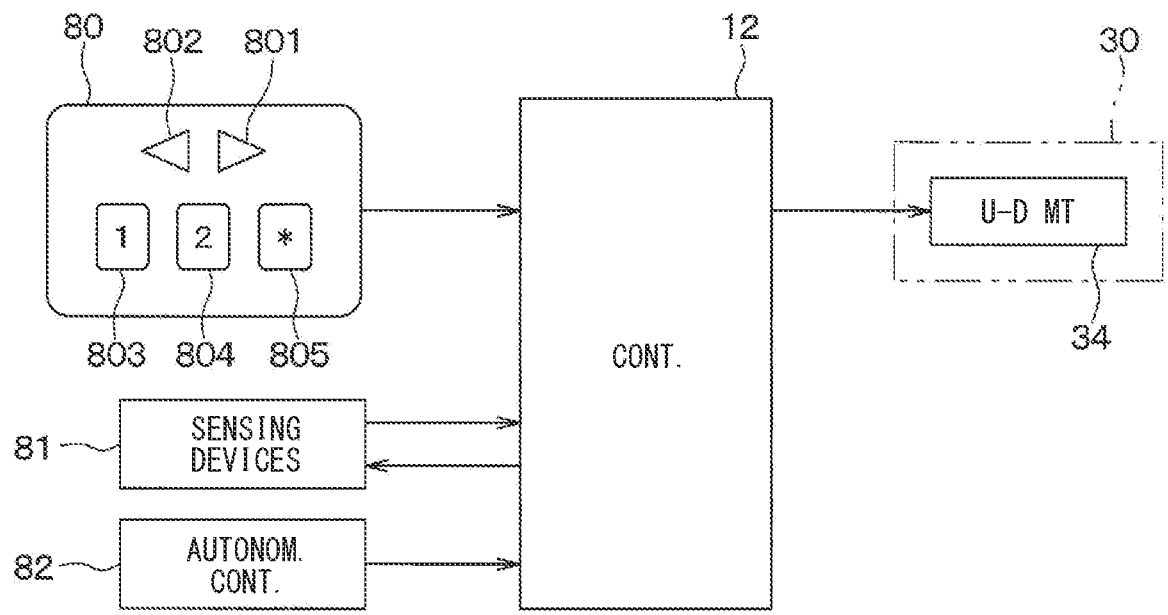
FIG. 16 is a block diagram relating to control of an adjusting device of a fourth embodiment, and corresponds to FIG. 5.

As shown in FIG. 16, the vehicle 70 (see FIG. 1) of this embodiment is provided with an autonomous drive operation control device 82 capable of performing the autonomous drive operation of the vehicle 70. That is, the vehicle 70 in this embodiment can be driven with each of the autonomous drive operation and a normal drive operation.

Specifically, the autonomous drive operation performed by the autonomous drive operation control device 82 of this embodiment is the autonomous drive operation which may be ranked as the Level 3 or Level 4 of an autonomous drive operation levels. The Level 3 autonomous drive operation is defined as "a state in which a system performs all acceleration, steering, and braking under specific conditions, and a driver can perform when the system requests." The Level 4 autonomous drive operation is defined as "a state in which acceleration, steering, and braking are all performed by something other than a driver under specific conditions, and the driver is not involved at all."

For example, the autonomous drive operation control device 82 controls a vehicle speed during the autonomous drive operation by recognizing the surrounding conditions of the vehicle 70 from various sensors, cameras, etc., and commanding the throttle control device 741 (see FIG. 4) and the brake control device 751. At the same time, the autonomous drive operation control device 82 controls the steering of the vehicle 70 by operating actuators connected to a steering device of the vehicle 70.

On the other hand, the above-described normal drive operation of the vehicle 70 is operation of the vehicle 70 which is not the autonomous drive operation at Levels 3 and 4, and is a vehicle drive maneuver in which any or all of acceleration, steering, and braking of the vehicle 70 must be performed by the passenger 72 as the driver.

For example, the autonomous drive operation control device 82 starts the autonomous drive operation if the passenger 72 operates a predetermined switch while the autonomous drive operation is not performed on the condition that the predetermined preconditions for performing the autonomous drive operation is satisfied. The autonomous drive operation control device 82 outputs to the control unit 12 an electric signal indicative of initiating the autonomous drive operation if the vehicle drive maneuver is switched from the normal drive operation to the autonomous drive operation, e.g., the autonomous drive operation is started. The autonomous drive operation control device 82 outputs to the control unit 12 an electric signal indicative of canceling the autonomous drive operation if the vehicle drive maneuver is switched from the autonomous drive operation to the normal drive operation, e.g., the autonomous drive operation is canceled.

Figure 17:
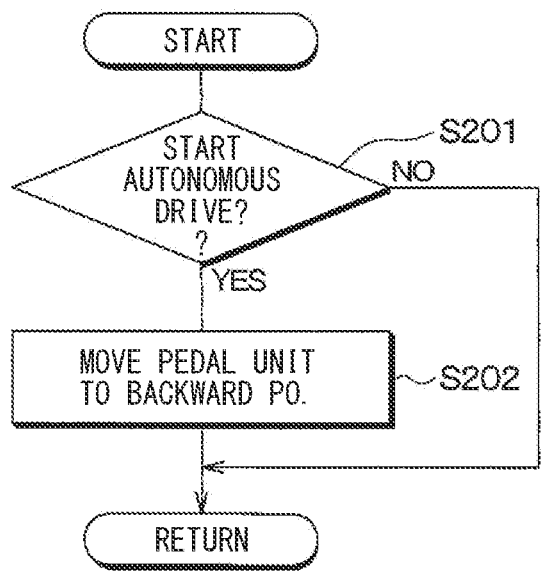
FIG. 17 is a flowchart showing control processing executed by a control unit of a fourth embodiment.

FIG. 17 is a flowchart showing control processing executed by the control unit 12 of this embodiment. The control processing of FIG. 17 is periodically and repeatedly executed. Also, the control process of FIG. 17 is executed in parallel with the control process of FIG. 10 described above.

As shown in FIG. 17, the control unit 12 first determines whether or not autonomous drive operation of the vehicle 70 has started in a step S201. For example, the control unit 12 determines that the automatic operation of the vehicle 70 has started when the electric signal indicating that the automatic operation has started is obtained from the automatic operation control device 82.

The autonomous drive operation determined in the step S201 is the autonomous drive operation which may be ranked as the Level 3 or Level 4 of an autonomous drive operation levels. Therefore, the autonomous drive operation determined in the step S201 is a vehicle drive maneuver in which the autonomous drive operation control device 82 performs an acceleration, a steering, and a braking of the vehicle 70, and no monitoring by the passenger 72 is necessary at least during the autonomous drive operation.

If it is determined in the step S201 that the autonomous drive operation of the vehicle 70 is started, the process proceeds to a step S202. On the other hand, if it is determined that the autonomous drive operation of the vehicle 70 is not started, the flowchart of FIG. 17 ends and starts again from the step S201.

Figure 18:
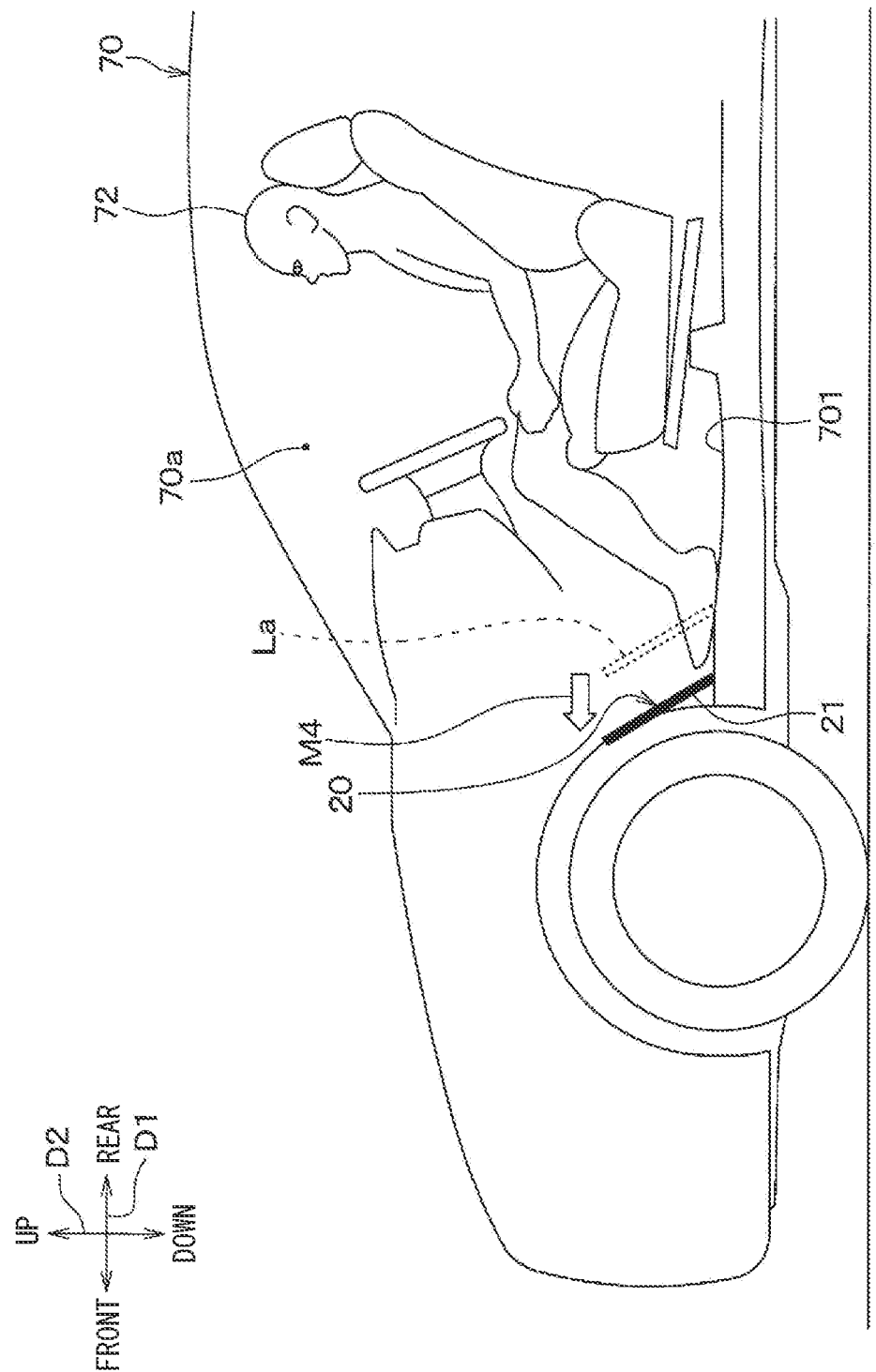
FIG. 18 is a diagram showing how the pedal unit is moved backward at a start of an autonomous drive operation of the vehicle according to a schematic diagram corresponding to FIG. 1.

In the step S202, the control unit 12 operates the front-rear motor 34 of the adjusting device 30 to move the pedal unit 20 to the vehicle front side as indicated by an arrow M4 in FIG. 18. That is, the control unit 12 moves the pedal unit 20 by using the adjusting device 30 so that a unit front-rear position of the pedal unit 20 is controlled to a predetermined backward position. The backward position is a position where the pedal unit 20 can keep distance from legs of the seated passenger 72 in the vehicle front side. For example, the backward position in this embodiment is the most front position in the movable range of the pedal unit 20 in the vehicle front-rear direction D1. A dashed line La in FIG. 18 indicates the accelerator pedal 21 before the pedal unit 20 is moved to the backward position.

If the processing of the step S202 is finished, the flowchart of FIG. 17 ends and starts again from the step S201.

(1) As described above, according to this embodiment, if it is the case where the autonomous drive operation starts, the control unit 12 moves the pedal unit 20 by the adjusting device 30 to the most front position in the movable range of the pedal unit 20 in the vehicle front-rear direction D1. That is, the pedal unit 20 is moved backward in the vehicle front side so as to be distanced away from the feet of the passenger 72. Therefore, it is possible to avoid the pedal unit 20 from being interfered with the legs of the passenger 72 during performing the autonomous drive operation in comparison with the case where the pedal unit 20 does not move backward from the feet of the passenger 72 even when the autonomous drive operation is started. Therefore, it is possible to improve a comfort of the passenger 72 during the autonomous drive operation.

This embodiment is similar to the first embodiment, except for the above described aspects. Thus, this embodiment can achieve the advantages obtained by the configuration common to the first embodiment described above in a similar manner as in the first embodiment.

Note that this embodiment is a modification based on the first embodiment, but it is possible to combine this embodiment with the second embodiment or the third embodiment described above.

OTHER EMBODIMENTS (1) In each of the above-described embodiments, the accelerator pedal operation amount Qac is expressed by the rotational angle of the accelerator pedal 21 as shown in FIG. 4, but it may be represented by a physical quantity other than the rotational angle. This also applies to the brake pedal operation amount Qbr. This is because it is possible to assume a configuration in which the accelerator pedal 21 and the brake pedal 22 move in parallel in the vehicle front-rear direction D1 in response to a depressing operation by the passenger 72.

(2) In each of the above-described embodiments, as shown in FIG. 4, the accelerator pedal 21 and the brake pedal 22 are the organ-type pedals, but this is just an example. For example, the accelerator pedal 21 and the brake pedal 22 may be pedals suspended from the pedal rotation shaft.

(3) In each of the above-described embodiments, as shown in FIG. 4, the master cylinder is not involved in the brake fluid pressure circuit which supplies the brake fluid pressure to each of the wheel cylinders 781, 782, 783 and 784, but this is just an example. For example, the hydraulic pump 762 and the pump motor 763 in FIG. 4 may be replaced with an electric master cylinder. In this case, the brake hydraulic circuit has an electric master cylinder, but the brake pedal 22 is not mechanically connected to the master cylinder at all.

(4) In each of the above-described embodiments, as shown in FIGS. 6 and 7, the right guide hole 36a and the left guide hole 37a are formed as through holes, but this is just an example. For example, if the right guided shaft 232 and the left guided shaft 233 can be fitted into the right guide hole 36a and the left guide hole 37a, respectively, one of the right guide hole 36a and the left guide hole 37a may be a blind hole which is just depressed and is not penetrated.

(5) In each of the embodiments described above, as shown in FIGS. 8 and 9, the adjusting device 30 is configured to be able to adjust the position and posture of the pedal unit 20, but this is an example. The adjusting device 30 may be configured to maintain one of the position and posture of the pedal unit 20 and adjust only the other.

(6) In each of the above-described embodiments, as shown in FIGS. 8 and 9, the adjusting device 30 is configured to be able to adjust both the position and the posture of the pedal unit 20 by using only one of the front-rear motor 34 which moves the pedal unit 20 in the vehicle front-rear direction D1. In other words, the adjusting device 30 does not require a dedicated motor for adjusting the posture of the pedal unit 20. However, this is an example. For example, the adjusting device 30 may be provided with a dedicated motor for adjusting the posture of the pedal unit 20, and the adjusting device 30 may be configured to perform that the front-rear motor 34 only moves the pedal unit 20 in the vehicle front-rear direction D1.

(7) In the fourth embodiment described above, the backward position of the pedal unit 20 used in the step S202 in FIG. 17 is predetermined as the most front position in the movable range of the pedal unit 20 in the vehicle front-rear direction D1, but this is just an example. For example, the backward position may be a slightly deviated position from the most front position in the movable range of the pedal unit 20 in the vehicle front-rear direction D1 as long as the position is sufficiently distanced from the legs of the passenger 72 seated. That is, the backward position may be a predetermined position close to the front side of the movable range of the pedal unit 20 in the vehicle front-rear direction D1.

(8) In each of the above-described embodiments, as shown in FIGS. 4 and 5, the control unit 12, the throttle control device 741, the brake control device 751, and the autonomous drive operation control device 82 are configured as separate control devices, but this is just one example. For example, the control unit 12, the throttle control device 741, the brake control device 751, and the autonomous drive operation control device 82 may be integrally configured as a single control device.

(9) The present disclosure is not limited to the above-described embodiments, and can be implemented in various modifications. In addition, the embodiments described above are not unrelated to each other, and can be appropriately combined unless the combination is obviously impossible.

Further, in each of the above-mentioned embodiments, it goes without saying that components of the embodiment are not necessarily essential except for a case in which the components are particularly clearly specified as essential components, a case in which the components are clearly considered in principle as essential components, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number.

Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

The control unit 12 and the method thereof described in the present disclosure may be implemented by a special purpose computer including a processor programmed to execute one or more functions by executing a computer program and a memory. Alternatively, the control unit 12 and the method thereof described in the present disclosure may be implemented by a dedicated computer provided by including a processor with one or more dedicated hardware logic circuits. Alternatively, the control unit 12 and the method described in the present disclosure may be implemented by one or more special purpose computer, which is configured as a combination of a processor and a memory, which are programmed to perform one or more functions, and a processor which is configured with one or more hardware logic circuits. The computer program may be stored in a computer-readable non-transitory tangible storage medium, as an instruction to be executable by a computer.

What is claimed is:

1. A pedal device to be mounted on a vehicle, the pedal device comprising:
   a brake pedal which is operated to be depressed by a leg of a passenger and an operation amount of a depressing operation is transmitted as an electrical signal;
   an accelerator pedal which is operated to be depressed by a leg of a passenger and an operation amount of a depressing operation is transmitted as an electrical signal;
   a support member which is connected with the brake pedal and the accelerator pedal, respectively, and supports the brake pedal and the accelerator pedal so as to be able to swing in response to a depressing operation by a leg of a passenger; and
   an adjusting device which adjusts a position or a posture of a pedal unit including the brake pedal, the accelerator pedal and the support member;
   herein the adjusting device includes:
   a screw actuator extending along a front-year direction of the vehicle;
   a motor which rotates the screw actuator;
   a front-rear moving member which has a nut portion screwed into the screw actuator and a support member connecting portion and is movably supported in the front-rear direction of the vehicle; and
   a guide member which is formed with a guide hole penetrating or being depressed in a right-left direction of the vehicle, wherein
   the guide hole extends with respect to the front-rear direction of the vehicle so that the more a front side of the vehicle is, the more on an up side of the vehicle, and wherein
   the support member has a guided shaft fitted in the guide hole, and is connected to the support member connecting portion so as to be rotatable about a rotation axis which is positioned on a rear side of the vehicle relative to the guided shaft and extends in the right-left direction of the vehicle, and wherein
   the guide hole determines a position of the guided shaft in an up-down direction of the the vehicle.

2. The pedal device according to claim 1, wherein the adjusting device performs adjusting the position or the posture of the pedal unit which includes adjusting a position of the pedal unit in a front-rear direction of the vehicle.

3. The pedal device according to claim 1, wherein the adjusting device performs adjusting the position or the posture of the pedal unit which includes adjusting an inclination of the pedal unit in a view along a right-left direction of the vehicle.

4. The pedal device according to claim 1, wherein the adjusting device performs adjusting the position or the posture of the pedal unit which includes adjusting a position of the pedal unit in a right-left direction of the vehicle.

5. The pedal device according to claim 1, wherein the adjusting device performs adjusting the position or the posture of the pedal unit which includes adjusting a position of the pedal unit in an up-down direction of the vehicle.

6. The pedal device according to claim 1, wherein the adjusting device determines an inclination of the pedal unit according to a unit front-rear position in accordance with a predetermined relationship between a unit front-rear position of a position of the pedal unit in a front-rear direction of the vehicle and the inclination of the pedal unit in a view along a right-left direction of the vehicle.

7. The pedal device according to claim 6, wherein the adjusting device has a single actuator which changes an inclination of the pedal unit while moving the pedal unit in the front-rear direction of the vehicle.

8. The pedal device according to claim 1, wherein the accelerator pedal has an accelerator pad surface which is operated to be depressed by a leg of the passenger when the accelerator pedal is operated by the leg of the passenger, and wherein
the accelerator pad surface faces a rear side and oblique to an up side in the vehicle at a no-accelerator depressing operation period in which the accelerator pedal does not receive any depressing operation, and wherein
the adjusting device changes a posture of the pedal unit so as to approach a direction of the accelerator pad surface at the no-accelerator depressing operation period to a direction of a plane which has a normal vector direction in a vehicle front-rear direction, as the pedal unit is moved toward a vehicle front side.

9. The pedal device according to claim 1, wherein the brake pedal has a brake pad surface which is operated to be depressed by a leg of the passenger when the brake pedal is operated by the leg of the passenger, and wherein
the brake pad surface faces a rear side and oblique to an up side of the vehicle in a no-brake depressing operation period at which the brake pedal does not receive any depressing operation, and wherein
the adjusting device changes a posture of the pedal unit so as to approach a direction of the brake pad surface at the no-brake depressing operation period to a direction of a plane which has a normal vector direction in a vehicle front-rear direction, as the pedal unit is moved toward a vehicle front side.

10. The pedal device according to claim 1, further comprising:
    a control unit which controls the adjusting device, wherein
    the vehicle is provided with an autonomous drive operation control device capable of performing an autonomous drive operation of the vehicle, and wherein
    the autonomous drive operation is a vehicle drive maneuver in which the autonomous drive operation control device performs an acceleration, a steering, and a braking of the vehicle, and no monitoring by the passenger is necessary at least during the autonomous drive operation, and wherein the control unit moves the pedal unit by the adjusting device to a predetermined position close to a front side or the most front position in a movable range of the pedal unit in a vehicle front-rear direction, if the autonomous drive operation is started.

11. The pedal device according to claim 1, further comprising:

a control unit which controls the adjusting device, wherein the control unit stores a plurality of target of positions or postures of the pedal unit as target installation states in advance, and controls the adjusting device to adjust the position or the posture of the pedal unit so that the position or the posture of the pedal unit becomes the target installation state which is selected from among a plurality of target installation states.

12. The pedal device according to claim 1, further comprising a control unit which controls the adjusting device, the control unit controls a sensing device to sense a physique of the passenger, and controls the adjusting device to adjust the position or the posture of the pedal unit based on information obtained by the sensing.

13. The pedal device according to claim 1, wherein the brake pedal and the accelerator pedal are organ-type pedals.

14. The pedal device according to claim 1, further comprising:

a footrest which is included in the pedal unit, is arranged on a left side in the vehicle with respect to the brake pedal, and is fixed to the support member.

15. A pedal device to be mounted on a vehicle, the pedal device comprising:

a brake pedal which is operated to be depressed by a leg of a passenger and an operation amount of a depressing operation is transmitted as an electrical signal;

an accelerator pedal which is operated to be depressed by a leg of a passenger and an operation amount of a depressing operation is transmitted as an electrical signal;

a support member which is connected with the brake pedal and the accelerator pedal, respectively, and supports the brake pedal and the accelerator pedal so as to be able to swing in response to a depressing operation by a leg of a passenger; and a screw actuator which includes at least one motor and a screw engaging the motor and the support member to move a pedal unit including the brake pedal, the accelerator pedal and the support member in order to adjust a position or a posture of the brake pedal and the accelerator pedal; wherein the screw actuator extends along a front-rear direction of the vehicle:

the motor is configured to rotate the screw actuator;

a front-rear moving member which has a nut portion screwed into the screw actuator and a support member connecting portion and is movably supported in the front-rear direction of the vehicle; and a guide member which is formed with a guide hole penetrating or being depressed in a right-left direction of the vehicle, wherein the guide hole extends with respect to the from ear direction of the vehicle so that the more front side of the vehicle is, the more on an up side of the vehicle, and wherein the support member has a guided shaft fitted in the guide hole, and is connected to the support member connecting portion so as to be rotatable about a rotation axis which is positioned on a rear side of vehicle relative to the guide shaft and extends in the right-left direction of the vehicle, and wherein the guide hole determines a position of the guided shaft in an up-down direction of the vehicle.

* * * * *